(12) United States Patent
Sakaguchi et al.

(10) Patent No.: US 11,472,419 B2
(45) Date of Patent: Oct. 18, 2022

(54) VEHICLE CONTROL DEVICE

(71) Applicant: Hitachi Automotive Systems, Ltd., Hitachinaka (JP)

(72) Inventors: Tomoyasu Sakaguchi, Hitachinaka (JP); Takashi Tsutsui, Hitachinaka (JP); Yoshiyuki Yoshida, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 17/040,135

(22) PCT Filed: Feb. 15, 2019

(86) PCT No.: PCT/JP2019/005497
§ 371 (c)(1),
(2) Date: Sep. 22, 2020

(87) PCT Pub. No.: WO2019/187750
PCT Pub. Date: Oct. 3, 2019

(65) Prior Publication Data
US 2021/0078586 A1 Mar. 18, 2021

(30) Foreign Application Priority Data
Mar. 28, 2018 (JP) .............................. JP2018-062525

(51) Int. Cl.
*B60W 40/114* (2012.01)
*B60W 30/06* (2006.01)
*B60W 40/105* (2012.01)

(52) U.S. Cl.
CPC .......... *B60W 40/114* (2013.01); *B60W 30/06* (2013.01); *B60W 40/105* (2013.01); *B60W 2520/14* (2013.01); *B60W 2520/28* (2013.01)

(58) Field of Classification Search
CPC .. B60W 40/114; B60W 30/06; B60W 40/105; B60W 2520/14; B60W 2520/28;
(Continued)

(56) References Cited

U.S. PATENT DOCUMENTS

| 5,402,365 A * | 3/1995 | Kozikaro | G01C 22/025 701/1 |
| 6,230,100 B1 * | 5/2001 | Geier | G01C 22/025 342/357.36 |

(Continued)

FOREIGN PATENT DOCUMENTS

| JP | H11-37773 A | 2/1999 |
| JP | 2012-081905 A | 4/2012 |

(Continued)

OTHER PUBLICATIONS

South-pointing chariot https://en.wikipedia.org/wiki/South-pointing_chariot 1030 B.C. (Year: 1030).*

(Continued)

*Primary Examiner* — Jaime Figueroa
*Assistant Examiner* — Sihar A Karwan
(74) *Attorney, Agent, or Firm* — Foley & Lardner LLP

(57) ABSTRACT

Provided is a vehicle control device capable of accurately estimating a self-vehicle location with a yaw angle error occurring when a vehicle starts to travel due to an initial phase shift between pulsed waveforms of left and right wheels when the vehicle starts to travel suppressed. The vehicle control device further estimates a direction of wheel rotation while the vehicle is at a stop. A yaw angle deviation when the vehicle starts to travel is estimated and corrected on the basis of a weighted average of discrete yaw angle values obtained immediately after the vehicle starts to travel from wheel speed sensors installed on left and right non-steered wheels of the vehicle. A yaw angle while the vehicle (Continued)

is at a stop and a yaw angle when the vehicle starts to travel are also estimated, and the direction of wheel rotation while the vehicle is at a stop is also estimated from a difference between the yaw angles. The yaw angle and coordinates are corrected on the basis of the estimation result.

9 Claims, 23 Drawing Sheets

(58) Field of Classification Search
CPC ............ B60W 2530/201; B60W 40/10; B62D 15/0285; B62D 15/024
See application file for complete search history.

(56) References Cited

U.S. PATENT DOCUMENTS

| | | | |
|---|---|---|---|
| 2014/0288828 A1* | 9/2014 | Werner | G01C 21/00 701/527 |
| 2016/0185355 A1 | 6/2016 | Yamaguchi | |
| 2018/0172455 A1 | 6/2018 | Yamaguchi | |
| 2020/0377100 A1* | 12/2020 | Sano | B60W 30/10 |

FOREIGN PATENT DOCUMENTS

| | | |
|---|---|---|
| JP | 2014-144764 A | 8/2014 |
| WO | WO-2015/015939 A1 | 2/2015 |
| WO | WO-2016/189732 A1 | 12/2016 |

OTHER PUBLICATIONS

International Search Report with English translation and Written Opinion issued in corresponding application No. PCT/JP2019/005497 dated May 14, 2019.

* cited by examiner

IN CASE OF STEADY STATE CIRCLE

IN CASE OF TEMPORARY STOP

FIG. 14

| INDEX | VEHICLE SPEED | YAW ANGLE |
|---|---|---|
| 0 | VSP0 | Yaw0 |
| 1 | VSP1 | Yaw1 |
| 2 | VSP2 | Yaw2 |
| 3 | VSP3 | Yaw3 |
| ... | ... | ... |
| | | |
| | | |

FIG. 25

| RL COUNT WHILE VEHICLE IS AT STOP | RR COUNT WHILE VEHICLE IS AT STOP | Yawdiff | RL COUNT WITH DIRECTION | RR COUNT WITH DIRECTION | YAW ANGLE ERROR AMOUNT Yawerror | TRAVEL DISTANCE CORRECTION AMOUNT Lerror |
|---|---|---|---|---|---|---|
| EVEN | EVEN | — | 0 | 0 | 0 | 0 |
| EVEN | ODD | ≤0 | 0 | +1 | −δ | +Pl/2 |
|  |  | 0< | 0 | −1 | +δ | −Pl/2 |
| ODD | EVEN | ≤0 | −1 | 0 | −δ | −Pl/2 |
|  |  | 0< | +1 | 0 | +δ | +Pl/2 |
| ODD | ODD | <−d | −1 | +1 | −2δ | 0 |
|  |  | −d≤ ≤d | −1 or +1 | −1 or +1 | 0 | −Pl or +Pl |
|  |  | d< | +1 | −1 | +2δ | 0 |

LOST CHANGE IN YAW ANGLE IN CLOCKWISE DIRECTION IS NEGATIVE (−)
δ: AMOUNT OF CHANGE IN YAW ANGLE PER LEFT AND RIGHT DIFFERENCE COUNT

TRAVEL IN FORWARD DIRECTION IS POSITIVE (+)
Pl: TRAVEL DISTANCE PER COUNT

VEHICLE CONTROL DEVICE

TECHNICAL FIELD

The present invention relates to a vehicle control device, and more particularly, to a vehicle control device that estimates a self-vehicle location for vehicle location control.

BACKGROUND ART

In a system such as an automatic driving system, a driver assistance system, or an automatic parking system, it is important for the system itself to locate a self-vehicle in order to control the vehicle in accordance with external conditions. There are various methods for locating the self-vehicle available in terms of a system configuration, but as a method for estimating the self-vehicle location of the vehicle without relying on an external recognition sensor such as a GPS, a radar, or a camera, a method called dead reckoning for estimating the self-vehicle location using information from a self-vehicle sensor such as a wheel speed sensor, a steering-angle sensor, an acceleration sensor, or a gyro sensor is known.

The wheel speed sensor generates a pulsed waveform by rotating a cam coder attached to a wheel to cause projections and depressions of the cam coder to pass through the wheel speed sensor and causes a controller connected to the wheel speed sensor to detect leading and trailing edges of the pulsed waveform to count the leading and trailing edges. The total number of the leading and trailing edges of the pulsed waveform per rotation of the wheel is determined by the number of teeth of the cam coder, and is counted as 90 times per rotation of the wheel, for example. A rotation angle of the wheel can be measured from the count (number), and a travel distance of the wheel (that is, the vehicle) can be determined from the rotation angle together with information on a perimeter of the wheel.

In particular, for the automatic parking system, since the vehicle travels at a low speed, wheel slippage is nearly negligible. Therefore, it is known that dead reckoning using only the wheel speed sensor or dead reckoning using a combination of the wheel speed sensor and other sensors can provide a certain degree of accuracy.

The following PTL 1 discloses a dead reckoning method using a wheel speed sensor and gyro sensor in which a travel distance is obtained using the wheel speed sensor, and a yaw angle of a vehicle is obtained using the gyro sensor.

CITATION LIST

Patent Literature

PTL 1: JP 2012-81905 A

SUMMARY OF INVENTION

Technical Problem

However, the method for estimating the self-vehicle location using only the wheel speed sensor has a problem in yaw angle estimation error, particularly in yaw angle error when the vehicle starts to travel. For example, on the basis of the dead reckoning using only wheel speed pulses, the vehicle yaw angle is calculated as a discrete value, so that a vehicle travel path becomes a rough polygonal approximation and has low accuracy. Further, in order to make a quantum size (resolution) of the discrete value of the vehicle yaw angle finer, it is possible to use processing using a time average filter for the vehicle yaw angle or an angular speed calculated from the wheel speed, but the processing using a time average filter has a problem in accuracy in an acceleration and deceleration range. Further, since the wheel speed becomes unstable immediately after the vehicle starts to travel and immediately before the vehicle stops, the use of the angular speed has a problem that errors are accumulated every time the vehicle starts to travel and stops. Further, in conventional methods for estimating a yaw angle and methods for correcting a yaw angle error when a vehicle starts to travel, correction of a yaw angle error when a vehicle starts to travel is applicable only to a case where a vehicle starts straight-forward travel but not turning travel.

The present invention has been made in view of the above problems, and it is therefore an object of the present invention to provide a vehicle control device capable of suppressing a yaw angle error when a vehicle starts to travel due to an initial phase shift in pulsed waveform between left and right wheels when the vehicle starts to travel and estimating a self-vehicle location with high accuracy.

Further, another object of the present invention is to provide a vehicle control device capable of suppressing a yaw angle error and estimating a self-vehicle location when an increment in wheel speed pulse count whose rotation direction is unknown occurs while the vehicle is at a temporary stop.

Solution to Problem

A vehicle control device of the present invention for solving the above-described problems is configured to calculate an amount of change in yaw angle, a travel distance, and a forward and backward travel direction on the basis of information from a sensor installed on a vehicle and calculating, from the amount of change in yaw angle, the travel distance, and the forward and backward travel direction, a relative location and relative direction from an estimated start state of the travel direction of the vehicle to estimate a self-vehicle location.

Advantageous Effects of Invention

According to the present invention, the yaw angle error when the vehicle starts to travel can be suppressed, and the self-vehicle location can be estimated with high accuracy. Therefore, it is possible to increase accuracy in estimation of the travel direction of the vehicle and further to increase accuracy in vehicle control by correcting a travel direction estimation error when the vehicle starts to travel.

The other features related to the present invention will become apparent from the description of the present specification and the accompanying drawings. Problems, configurations, and effects other than those described above will be apparent from the description of the embodiment given below.

BRIEF DESCRIPTION OF DRAWINGS

FIG. 14 is a diagram showing a table used for calculating a vehicle-speed weighted average of yaw angles.

FIG. 25 is a determination table used for determining a wheel rotation direction.

DESCRIPTION OF EMBODIMENTS

Figure 1:
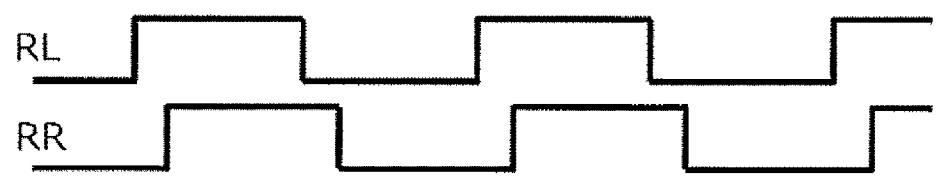
FIG. 1 is a diagram showing pulsed waveforms that result from shaping waveforms generated by wheel speed sensors of left and right rear wheels RL, RR that are non-steered wheels at an extremely low speed.

A vehicle control device of the present embodiment is configured to calculate an amount of change in yaw angle, a travel distance, and a forward and backward travel direction on the basis of information from a sensor installed on a vehicle and calculates a relative vehicle location and relative vehicle direction from the amount of change in yaw angle, the travel distance, and the forward and backward travel direction to estimate a self-vehicle location. The vehicle control device includes a wheel speed pulse counter, a gear position detector, and a self-vehicle location estimator, and the self-vehicle location estimator calculates the relative vehicle location and relative vehicle direction on the basis of vehicle speed pulses from a pair of non-steered wheels and a gear position. The self-vehicle location estimator calculates a yaw angle corresponding to the relative vehicle direction from a vehicle-speed weighted average of differences in travel distance between the pair of non-steered wheels. Then, through measurement of this relative direction at a plurality of movement points immediately after the vehicle starts to travel, an error in the relative direction when the vehicle starts to travel is estimated, and the relative location and relative direction are corrected.

This makes it possible to increase accuracy in estimation of the relative vehicle location and relative vehicle direction and in turn allows control using a yaw angle estimated value with high accuracy. In particular, correcting a travel direction estimation error when the vehicle starts to travel increases accuracy in vehicle control. In addition, when the vehicle control device of the present embodiment is applied to an automatic parking system, a system for guiding a vehicle from a parking start location to a parking destination location is improved, and accuracy of reaching the parking destination location is increased.

Next, a description will be given of a detailed structure of the vehicle control device of the present embodiment.

For example, when a straight line connecting two of wheels of the vehicle always passes near a turning center (the two wheels are non-steered wheels, that is, left and right rear wheels for many vehicles) and has a certain degree of accuracy, it is possible to obtain the vehicle travel distance and vehicle yaw angle only with wheel speed sensors installed on the two wheels. The outline of a dead reckoning method using only wheel speed pulses counted from pulsed waveforms generated by the wheel speed sensors is as follows.

(1) The amount of change in yaw angle θ can be calculated from differences in travel distance between the left and right non-steered wheels and left and right-side distances from a center between the left and right non-steered wheels to the left and right non-steered wheels. For example, the following equation (1) is used to calculate the amount of change in yaw angle θ from the wheel speed pulse counts of the wheel speed sensors installed on the two left and right non-steered wheels (amount of change in yaw angle calculation means).

$$\theta = \text{(difference in wheel speed pulse count between left and right wheels)} * \text{(travel distance per pulse)} / \text{(rear-wheel tread length)} \quad (1)$$

During forward traveling, when the count of the left wheel becomes greater, the amount of change in yaw angle corresponds to a yaw angle by which the vehicle turns clockwise (as viewed from above). On the other hand, when the count of the right wheel becomes greater, the amount of change in yaw angle corresponds to a yaw angle by which the vehicle turns counterclockwise (as viewed from above). During rearward traveling, the turning directions become opposite.

(2) The travel distance can be calculated from the average of the travel distances of the left and right non-steered wheels, and the travel distances of the left and right non-steered wheels can be calculated by the wheel speed sensors configured to count the pulses generated when the wheels rotate. For example, the following equation (2) is used to calculate a travel distance U of a center of an axle of the left and right non-steered wheels from the wheel speed pulse counts.

$$\text{Travel distance } U = (\text{average of left and right wheel speed pulse counts}) * (\text{travel distance per pulse}) \quad (2)$$

(3) The forward and backward travel direction is detected from the vehicle gear position. When the gear position indicates a forward gear, the travel direction is set to +1 and when the gear position indicates a reverse gear, the travel direction is set to −1. A configuration where each of the wheel speed sensors has a mechanism of detecting a rotation direction of a corresponding wheel eliminates the need of detection processing on the basis of the gear position.

(4) The relative location (X, Y) and relative direction (yaw angle) from the center of the axle of the left and right non-steered wheels and an estimated start state of the travel direction of the vehicle are output using the following equations (3) to (5) on the basis of the amount of change in yaw angle θ, travel distance L, and forward and backward travel direction of the vehicle.

$$\text{Yaw angle} = (\text{previous yaw angle}) + (\text{travel direction}) * (\text{amount of change in yaw angle } \theta) \quad (3)$$

$$X \text{ coordinate} = (\text{previous } X \text{ coordinate}) + (\text{travel direction}) * \sin(\text{yaw angle}) * (\text{travel distance } U) \quad (4)$$

$$Y \text{ coordinate} = (\text{previous } Y \text{ coordinate}) + (\text{travel direction}) * \cos(\text{yaw angle}) * (\text{travel distance } U) \quad (5)$$

Sequentially executing the above (1) to (4) in each control period makes it possible to estimate the relative location (self-vehicle location) from the estimated start point (for example, a travel-start position) with a certain degree of accuracy.

However, in a case where the XY coordinates and the yaw angle are calculated by the wheel speed sensors as described above, since the self-vehicle location is estimated on the basis of the count number that is a quantized value, both the travel distance and the yaw angle are affected by the quantization. It tends to be considered that the quantization merely causes a quantization error in the calculation result, but an initial phase shift of the left and right pulsed waveforms when the vehicle starts to travel has a great influence on accuracy in estimation of the vehicle location. This initial phase shift mainly causes an error in estimated direction when the vehicle starts to travel (hereinafter, referred to as an error in yaw angle when the vehicle starts to travel). The error in yaw angle when the vehicle starts to travel affects all the results of the estimation of the vehicle location after the vehicle starts to travel, and the error in estimated location becomes greater in proportion to the distance from the travel-start position.

A more specific description will be given of the mechanism by which the error in yaw angle occurs when the vehicle starts to travel. FIG. 1 shows pulsed waveforms that result from shaping waveforms generated by the wheel speed sensors of the left and right rear wheels RL, RR that are non-steered wheels at an extremely low speed. Since there are few cases where pulses of the rear wheels RL, RR are completely in phase with each other, when path lengths of the rear wheels RL, RR are almost the same at an extremely low speed, the wheel speed pulse counts of the wheel speed sensors installed on the rear wheels RL, RR repeatedly make a transition from ON to OFF in an alternate manner, that is, in the order of left, right, left, right, or right, left, right, left.

Figure 2:
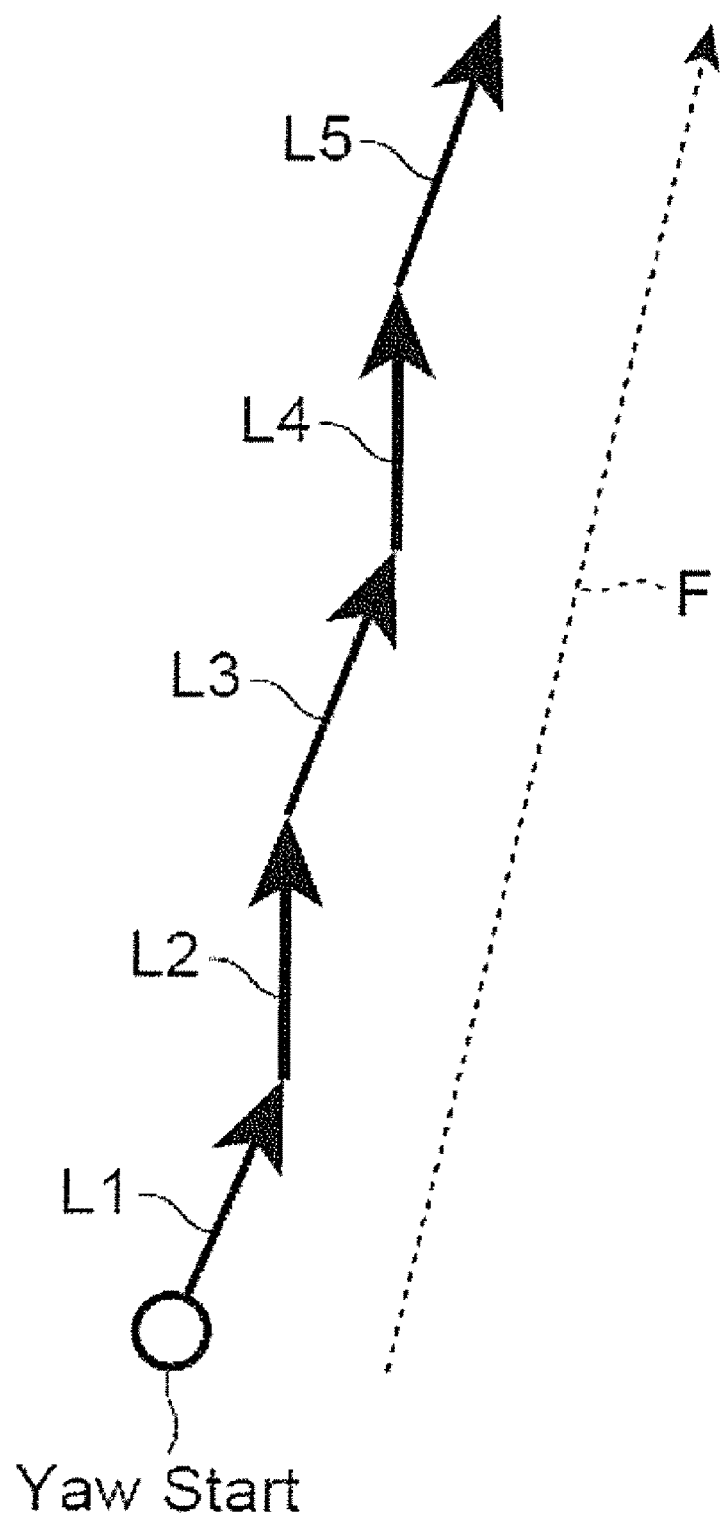
FIG. 2 is a diagram showing a path based on an estimated self-vehicle location at an extremely low speed immediately after a vehicle starts to travel.

FIG. 2 shows a path based on the estimated self-vehicle location at an extremely low speed immediately after the vehicle starts to travel. In accordance with the algorithm of the dead reckoning described above, paths L1 to 5 extend, in a zigzag manner, in a direction corresponding to a change in yaw angle at the first pulse. As a whole, the oblique-travel direction F is a direction corresponding to one half of the amount of change in yaw angle for each pulse (essentially relative to a reference direction in which the vehicle is intended to travel).

Figure 3:
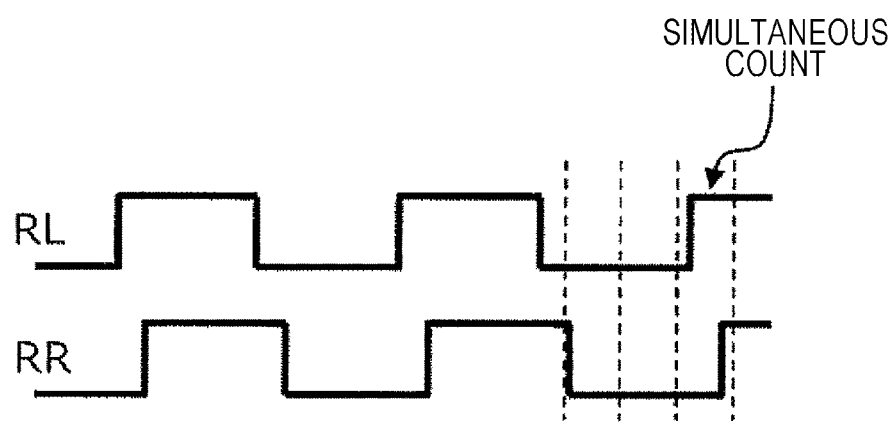
FIG. 3 is a diagram showing pulsed waveforms of the left and right rear wheels RL, RR when vehicle speed increases from the extremely low speed.

FIG. 3 shows pulsed waveforms of the rear wheels RL, RR when the vehicle speed increases from the extremely low speed. The pulses of the rear wheels RL, RR are individually output, and when the vehicle speed increases, the probability that the pulses of the pulsed waveforms of the rear wheels RL, RR are counted in the same control period (hereinafter, left and right simultaneous count or left and right simultaneous pulse detection) increases accordingly. When a difference in pulse timing between left and right wheels RL, RR is small, the probability of left and right simultaneous count further increases.

Figure 4:
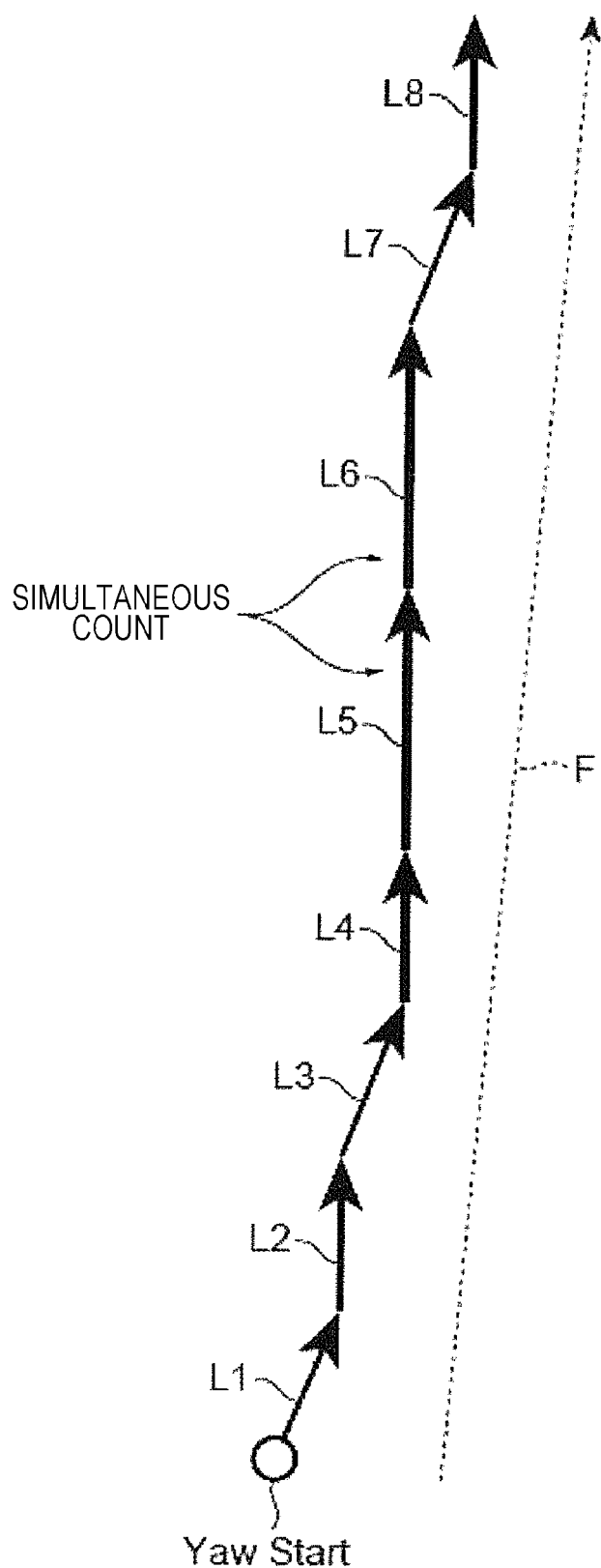
FIG. 4 is a diagram showing a path based on the estimated self-vehicle location when the vehicle speed increases after the vehicle starts to travel.

FIG. 4 shows paths L1 to L8 based on the estimated self-vehicle location when the vehicle speed increases after the vehicle starts to travel. As a whole, the travel direction F at departure depends on a phase difference in pulsed waveform between the rear wheels RL, RR. The paths L5, L6 are obtained when the pulses of the rear wheels RL, RR are simultaneously counted and extend straight from the path L4 with the amount of change in yaw angle kept zero.

Figure 5:
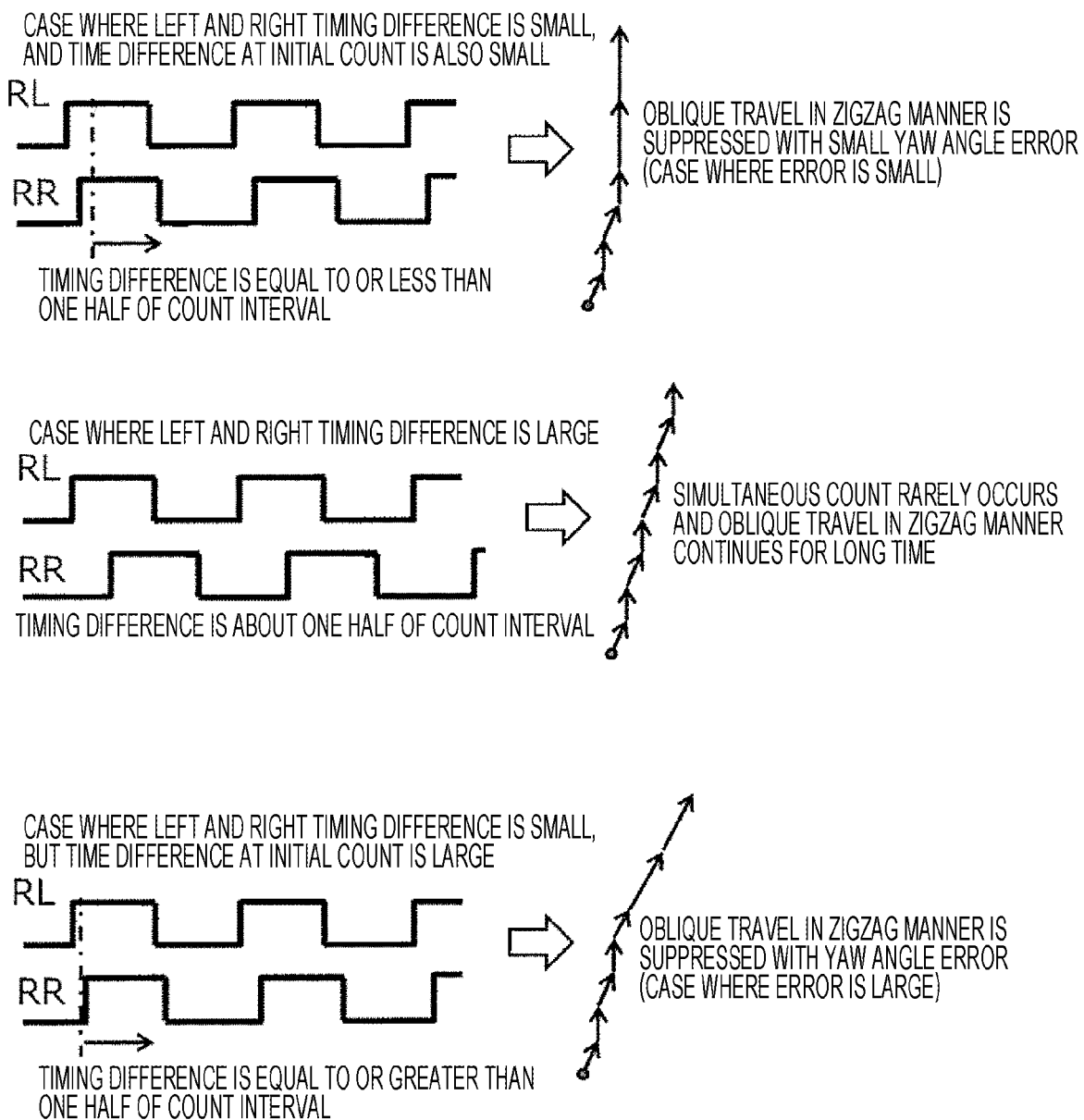
FIG. 5 is a diagram showing differences in path based on the estimated self-vehicle location due to a difference in pulse timing between left and right wheels.

FIG. 5 shows differences in path based on the estimated self-vehicle location due to the difference in pulse timing between left and right wheels. An example shown in the upper part of FIG. 5 is a case where the difference in pulse timing between left and right wheels is small, and the time difference at the initial count is also small and is equal to or less than one half of the count interval. An example shown in the middle part of FIG. 5 is a case where the difference in pulse timing between left and right wheels is large and is about one half of the count interval. An example shown in the lower part of FIG. 5 is a case where the difference in pulse timing between left and right wheels is small, but the time difference at the initial count is large and is equal to or greater than one half of the count interval.

As shown in the upper part of FIG. 5, when the difference in pulse timing between left and right wheels RL, RR is small compared to the pulse count interval, an increase in vehicle speed suppresses, at an early state, oblique travel in a zigzag manner with a small yaw angle error, and the path based on the estimated self-vehicle location starts to extend forward (the reference direction in which the vehicle is intended to travel).

As shown in the middle part of FIG. 5, when the difference in pulse timing between left and right wheels RL, RR is about one half of the pulse count interval, the pulses are rarely counted simultaneously, and oblique travel in a zigzag manner continues for a long time.

As shown in the lower part of FIG. 5, the difference in pulse timing between left and right wheels RL, RR is small, but when the time difference at the initial count is large, an increase in vehicle speed suppresses, at an early state, oblique travel in a zigzag manner, and the path based on the estimated self-vehicle location starts to extend obliquely (a direction oblique relative to the reference direction in which the vehicle is intended to travel). In other words, the oblique travel in a zigzag manner is suppressed with a yaw angle error, which results in a case where an error is large. As described above, the travel direction when the vehicle starts to travel depends on the phase difference in pulsed waveforms between the left and right wheels.

Figure 6:
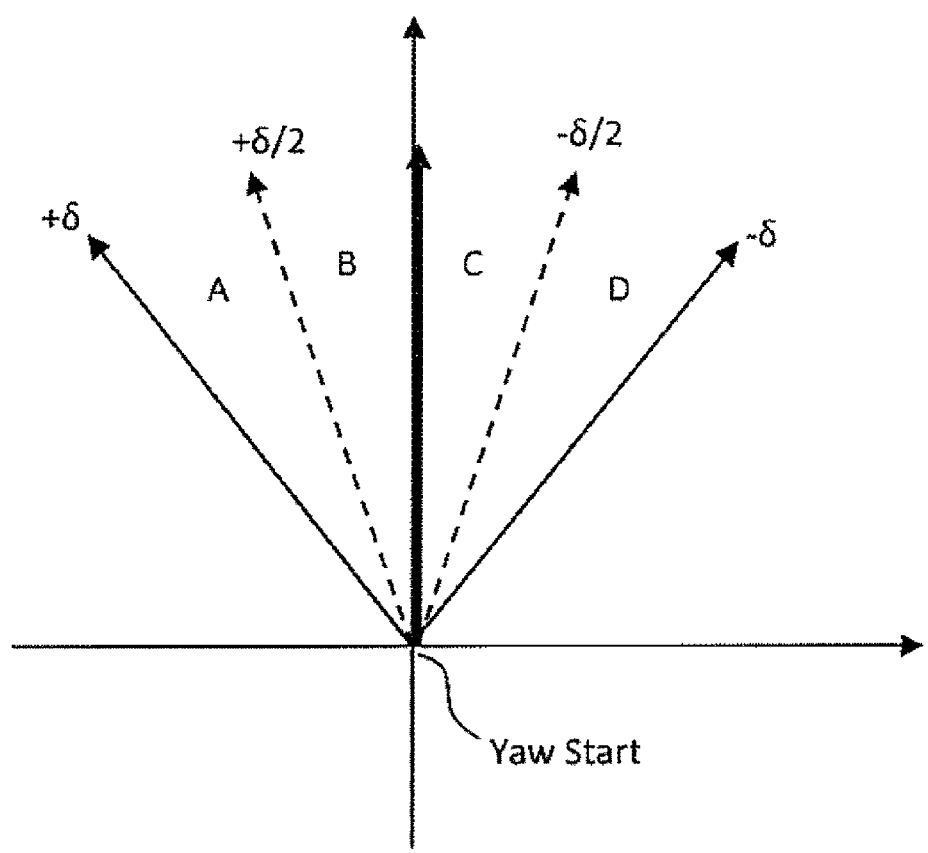
FIG. 6 is a diagram showing an error range of the path based on the estimated self-vehicle location due to the difference in pulse timing between left and right wheels RL, RR.

FIG. 6 shows the error range of the path based on the self-vehicle estimated location due to the difference in pulse timing between left and right wheels RL, RR. When no difference in pulse timing (difference in pulse phase) is present between the rear wheels RL, RR, the travel direction of the estimated path extends straight upward in FIG. 6.

Left and right solid arrows each indicate a direction, relative to the travel direction, that results from rotating the travel direction clockwise or counterclockwise by an amount of change in yaw angle δ (travel distance per pulse/rear-wheel tread length) based on a difference in wheel speed pulse count between left and right wheels per pulse.

When the difference in pulse timing of the right wheel RR is larger than one half of the pulse count interval, the estimated path in the travel direction of the vehicle extends to an area A shown in FIG. 6, and when the difference in pulse timing of the right wheel RR is smaller than one half of the pulse count interval, the estimated path in the travel direction of the vehicle extends to an area B shown in FIG. 6. Further, when the difference in pulse timing of the left wheel RL is smaller than one half of the pulse count interval, the estimated path in the travel direction of the vehicle extends to an area C, and when the difference in pulse timing of the left wheel RL is larger than one half of the pulse count interval, the estimated path in the travel direction of the vehicle extends to an area D. As described above, the yaw angle error in the self-vehicle location estimation when the vehicle starts to travel has the above-described ranges that vary in a manner that depends on the difference in pulse timing between left and right wheels.

Figure 7:
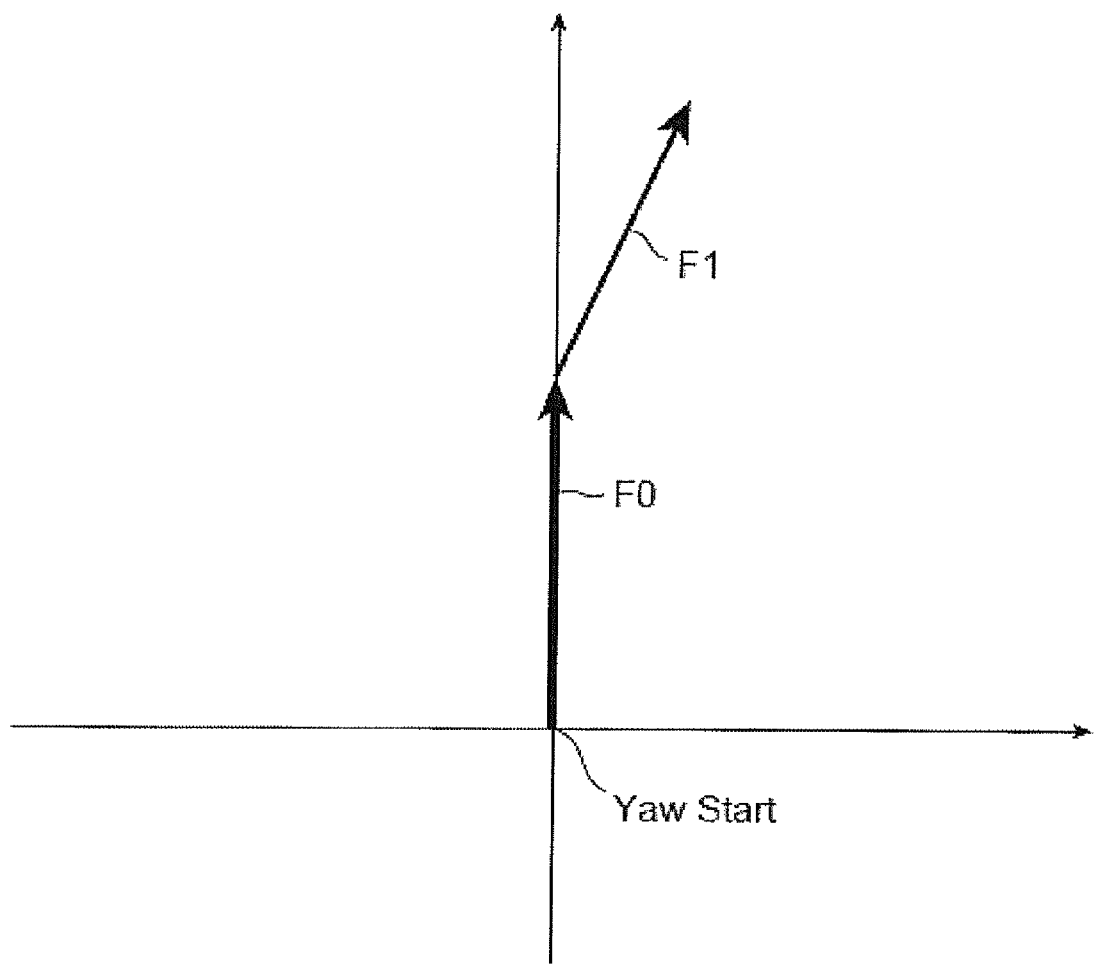
FIG. 7 is a diagram showing a path based on the estimated self-vehicle location when an estimated vehicle location immediately after the vehicle starts to travel is limited to a straight-travel direction.

In order to deal with such a situation, what is conceivable as a simple measure shown in FIG. 7 is a method by which the estimated location of the vehicle immediately after the vehicle starts to travel is limited to a straight-travel direction F0 with the difference in pulse timing between left and right wheels RL, RR when the vehicle starts to travel ignored.

However, according to the method described above, when the vehicle starts to turn immediately after the vehicle starts to travel, the turn cannot be detected. Further, when only a short distance immediately after the vehicle starts to travel is limited to the straight-travel direction F0 to allow the vehicle to turn, a point where an error occurs is simply advanced by the distance that is limited to the straight-travel direction F0.

The same error as the yaw angle error when the vehicle starts to travel may occur even when the vehicle is at a temporary stop after the vehicle starts to travel. When no change in the state of the wheels of the vehicle occurs while the vehicle is at a temporary stop, continuity of the yaw angle is not interrupted, and the same error as when the vehicle starts to travel does not occur. Even in a case where a change in the state of the vehicle occurs due to shaking of the vehicle or a change in steering angle of steered wheels of the vehicle while the vehicle is at a temporary stop, when no increment in count occurs or when an increment in count occurs, but the yaw angle value is correctly applied to the count, the same error as when the vehicle starts to travel does not occur.

However, while the vehicle is at a temporary stop, the travel direction of the vehicle may fail to be determined, and even when the wheel speed sensor increments the count, the rotation direction of the wheels may be opposite to the expected direction. Therefore, when the count is incremented while the vehicle is at a temporary stop, the yaw angle value may be applied to the count in the opposite direction. In such a case, a large yaw angle error occurs even while the vehicle is at a temporary stop.

In order to deal with such a situation, what is conceivable as a simple measure is a method by which the wheel speed pulse count that is generated while the vehicle is at a temporary stop and whose rotation direction is unknown is ignored. This method prevents the wheel speed pulse count from being applied to the yaw angle value in the opposite direction, but a yaw angle error will occur due to ignoring the count that needs to be correctly applied to the yaw angle value.

The vehicle control device of the present embodiment estimates the yaw angle error caused by the difference in pulse timing between left and right wheels when the vehicle starts to travel, and executes, after the estimation, processing of correcting the error. Since the yaw angle error is smaller than the amount of change in yaw angle θ per count, the yaw angle error is calculated from averaging the yaw angle values for a fixed distance or a fixed time.

Since the vehicle speed changes greatly near the travel-start point, an accurate yaw angle value cannot be obtained from averaging the yaw angle values simply on a time basis as in a conventional manner. Therefore, in the vehicle control device of the present embodiment, in order for the average calculation to convert duration of the yaw angle value into a continuous distance, the yaw angle value is weighted with the vehicle speed, and then an average distance is calculated (equation (6)).

$$\text{Accurate yaw angle value} = \Sigma(\text{yaw angle value} \ast \text{vehicle speed})/\Sigma \text{vehicle speed} \quad (6)$$

Since the yaw angle value in the above equation (6) is obtained from the difference in travel distance between the left and right wheels, the accurate yaw angle value in the above equation (6) can also be obtained from the vehicle-speed weighted average of the differences in travel distance between the left and right wheels (equation (6)').

$$\text{Accurate yaw angle value} = \Sigma(\text{difference in travel distance between left and right wheels/rear-wheel tread length} \ast \text{vehicle speed})/\Sigma \text{vehicle speed} \quad (6)'$$

According to the vehicle-speed weighted average calculation of the above equation (6), it is possible to obtain an accurate yaw angle value with a resolution smaller than the amount of change in yaw angle θ per count. The vehicle-speed weighted average value is an average yaw angle value for a fixed distance or a fixed time and is an accurate yaw angle value at a midpoint of a corresponding travel section. Therefore, the vehicle-speed weighted average value is different from the accurate yaw angle value when the vehicle starts to travel. Further, the vehicle speed may fail to be acquired with high accuracy when the vehicle starts to travel, and the travel section to which the vehicle-speed weighted average calculation is applied often cannot contain the point where the vehicle starts to travel.

However, when a change in yaw angle occurring from the travel-start point to a measurement point is small, such as when the travel-start point and the measurement point are close to each other, the yaw angle value at the measurement point can be approximately regarded as the yaw angle value at the travel-start point. In such a case, the yaw angle error when the vehicle starts to travel may be calculated from the accurate yaw angle value at the measurement point located as close as possible to the travel-start point. That is, it is possible to estimate the direction at the midpoint of the travel section extending to a point where correction is made and correct the relative location on the basis of the direction thus estimated.

Figure 8:
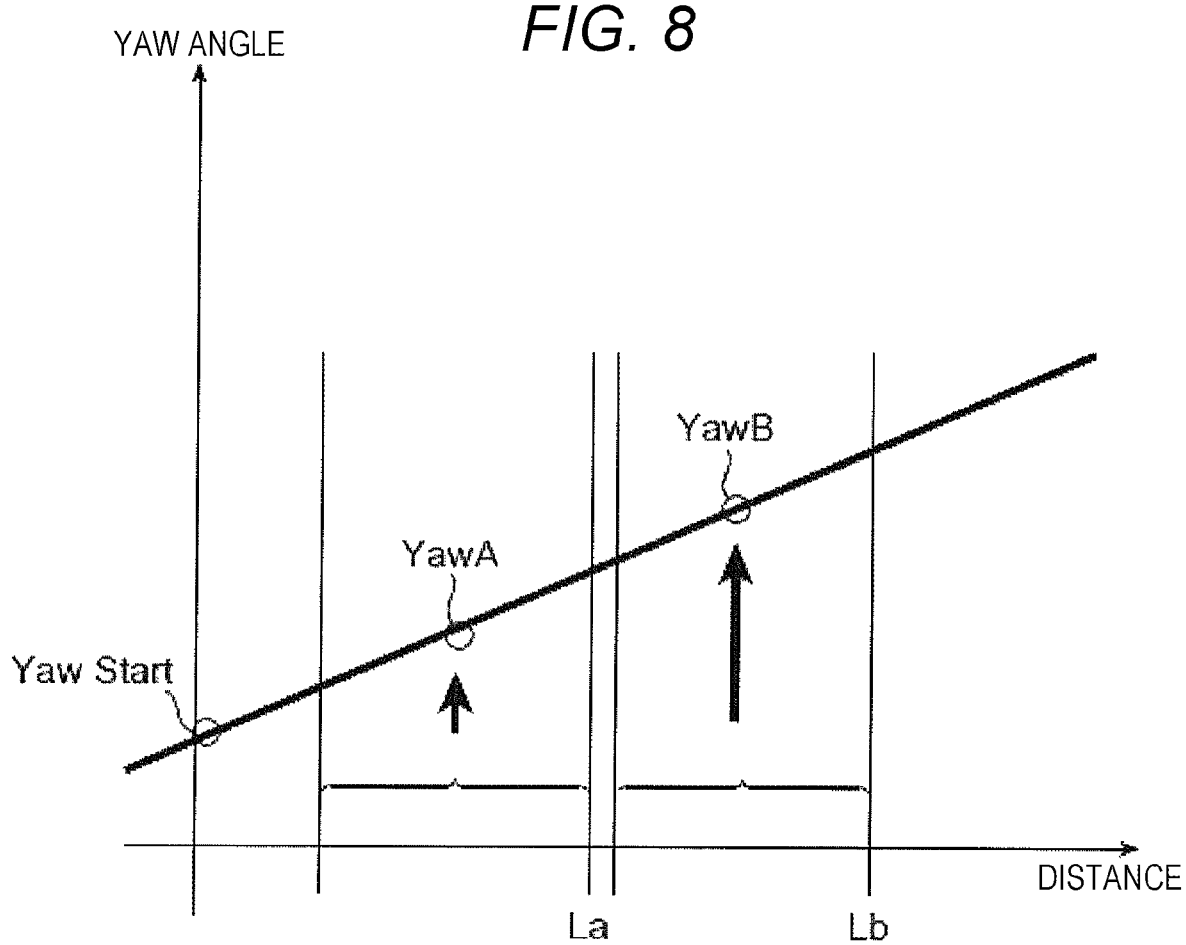
FIG. 8 is a diagram showing a method for estimating a yaw angle at a travel-start point.

Then, when a change in yaw angle occurring from the travel-start point to the measurement point is large due to the start of a turn at the travel-start point or the like, it is necessary to estimate the accurate yaw angle value when the vehicle starts to travel. In such a case, assuming that a curvature change in the vicinity of the travel-start point is constant (steady state circle or clothoid curve), a change in yaw angle is proportional to a distance in a circular turn, so that, as shown in FIG. 8, it is possible to estimate an accurate yaw angle Yawstart at the travel-start point (yaw angle shift when the vehicle starts to travel) from an extension line passing through two points corresponding to accurate yaw angles (vehicle-speed weighted averages of yaw angles) YawA, YawB calculated at two measurement points.

In the vehicle control device of the present embodiment, when the circular turn starts from the travel-start point, it is assumed that the curvature change in the vicinity of the travel-start point is constant (steady state circle or clothoid curve), and the accurate yaw angle (Yawstart) at the travel-start point (estimated start location) is calculated from the vehicle-speed weighted average of amounts of change in yaw angle obtained at two point after the vehicle starts to travel.

The number of measurement points is not limited to one or two, but a plurality of measurement points are provided, and the extension line is not limited to a straight line, but may be a curve such as a quadratic curve, thereby allowing estimation even in a case where the curvature changes. The yaw angle error when the vehicle starts to travel can be calculated from the difference between a desired yaw angle and accurate yaw angle at the travel-start point. Therefore, the relative direction from the travel-start location can be corrected on the basis of the yaw angle error when the vehicle starts to travel. Then, after correcting the yaw angle error when the vehicle starts to travel, the relative location can be corrected on the basis of a relationship between an estimated travel distance and yaw angle. The vehicle control device of the present embodiment is applicable to a case where a turn (turn along a steady state circle or clothoid curve) starts from the travel-start point and thus can increase accuracy in estimation of the travel direction of the vehicle when the vehicle starts to travel.

Further, the vehicle control device of the present embodiment has a fail-safe function of preventing an incorrect accurate yaw angle from being calculated. For example, the accurate yaw angle Yawstart at the travel-start point (yaw angle deviation when the vehicle starts to travel) is denoted by $\theta 0$, and the accurate yaw angle (vehicle-speed weighted average of yaw angles) YawA at a first point A away from the travel-start point by a distance L1 is denoted by $\theta 1$, and the accurate yaw angle (vehicle-speed weighted average of yaw angles) YawB at a second point B away from the travel-start point by a distance that is twice as long as the distance L1 is denoted by $\theta 2$. In such a case, an error in the accurate yaw angle YawA at the first point A is doubled as compared to an error in the accurate yaw angle Yawstart at the travel-start point ($\theta 0 = 2*(\theta 1 - \theta 2)$). Therefore, it is desirable that an abnormal value in the accurate yaw angle YawA be removed or corrected.

Herein, as shown in FIG. 8, a slope of the distance and the yaw angle has a limit that depends on vehicle performance (minimum turning radius, or the like), and the magnitude of the difference between $\theta 1$ and $\theta 2$ should also have an upper limit. Therefore, restrictions based on the relationship between the distance and the yaw angle are placed, and the value of the accurate yaw angle YawA that does not satisfy the following inequality is removed or corrected as an abnormal value.

$$|\theta 1 - \theta 2| < K1 \qquad (7)$$

where K1 is calculated from the vehicle performance.

That is, when the difference between the vehicle-speed weighted averages of the yaw angle values obtained at the plurality of time points after the vehicle starts to travel is equal to or greater than the upper limit value K1 calculated from the vehicle performance of the vehicle, the accurate yaw angle $\theta 1$ at the first point A is extracted as an abnormal value and then removed or corrected.

Figure 9:
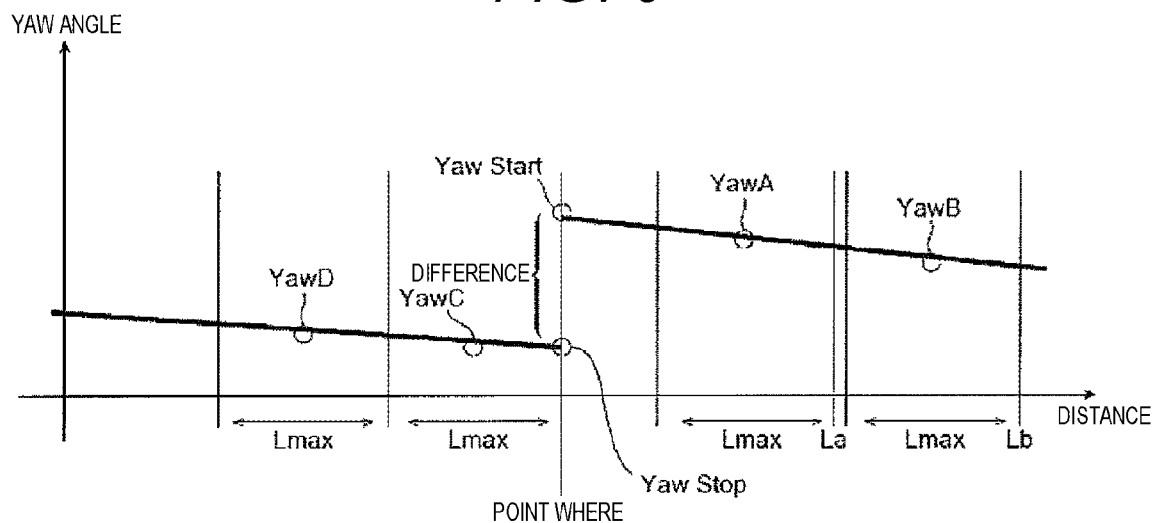
FIG. 9 is a diagram showing the method for estimating a yaw angle before the vehicle stops and resumes traveling.

While the vehicle is at a temporary stop, the rotation direction of the wheel speed pulse count generated by a slight wheel movement while the vehicle is at a stop is uncertain; therefore, the application of the wheel speed pulse count to the estimated yaw angle and the estimated location is put on hold. While the application is put on hold, the wheel speed pulse counts of the left and right wheels whose application has been put on hold are stored. Next, as shown in FIG. 9, accurate yaw angles before the vehicle stops and when the vehicle resumes traveling are calculated.

A method for calculating the accurate yaw angle when the vehicle resumes traveling is the same as the method applied when the vehicle starts to travel. The accurate yaw angle while the vehicle is at a stop can also be calculated by a method similar to the methods applied when the vehicle starts to travel and when the vehicle resumes traveling.

The accurate yaw angle while the vehicle is at a stop can be estimated from the accurate yaw angle obtained at at least one point before the vehicle stops.

In the difference between the accurate yaw angle while the vehicle is at a stop and the accurate yaw angle when the vehicle resumes traveling, motion while the vehicle is at a stop and the wheel speed pulse count whose application has been put on hold appear. The difference can be expressed by the equation (8).

$$\begin{aligned}&(\text{Accurate yaw angle when the vehicle resumes traveling}) - (\text{accurate yaw angle while the vehicle is at a stop}) = (\text{motion while the vehicle is at a stop}) + (\text{wheel speed pulse count whose application has been put on hold}) + (\text{measurement error})\end{aligned} \qquad (8)$$

Herein, it is not necessary to correct the motion while the vehicle is at a stop, and the measurement error cannot be corrected. Consideration will be given of a case where, on the basis of information on the difference between the accurate yaw angle while the vehicle is at a stop and the accurate yaw angle when the vehicle resumes traveling (referred to as a yaw angle gap), the left and right wheel speed pulse counts counted while the vehicle is at a stop whose application has been put on hold is correctly applied to the estimated yaw angle and estimated location.

When brakes are sufficiently applied to the wheels while the vehicle is at a stop, it is unlikely that the wheels will roll in the same direction for the number of wheel speed pulse count pulses while the vehicle is at a stop, so that it can be assumed that the wheels roll by a distance equivalent to at most one count.

When the vehicle is shaken from the outside while the vehicle is at a stop, a plurality of counts may be detected even if the vehicle remains at a stop at the original location, but it can be considered that the wheels roll by a distance equivalent to one count in a reciprocating manner, and if one reciprocating motion is equivalent to two counts, the occurrence of even counts can be ignored. Therefore, the left and right wheel speed pulses counted while the vehicle is at a stop may be stored as an even number or an odd number for each of the left and right sides. 0 or 1 rather than an even number or an odd number may be stored.

Patterns of the left and right wheel speed pulses counted while the vehicle is at a stop include four patterns of an even number and an even number, an even number and an odd number, an odd number and an even number, and an odd number and an odd number. In the even number and even number pattern, the yaw angle gap is (motion while the vehicle is at a stop)+(measurement error), and no correction is necessary.

In the even number and odd number pattern and odd number and even number pattern, the yaw angle gap is (motion while the vehicle is at a stop)+(wheel speed pulse count whose application has been put on hold)+(measurement error), but when the sum of (motion while the vehicle is at a stop) and (measurement error) is smaller than (wheel speed pulse count whose application has been put on hold), the sign of the yaw angle gap coincides with the sign of (wheel speed pulse count whose application has been put on hold). Accordingly, the sign of the wheel speed pulse count whose application has been put on hold can be obtained, and a determination can be made that odd counts, practically, one count, counted for the left wheel or right wheel are generated by rotation of a corresponding wheel in the forward direction or backward direction.

In the odd number and odd number pattern, (wheel speed pulse count whose application has been put on hold) is zero when both the left and right wheels rotate forward or backward. When the left wheel rotates forward and the right wheel rotates backward, it causes clockwise rotation, and when the left wheel rotates backward and the right wheel rotates forward, it causes counterclockwise rotation. When a change in yaw angle equivalent to two counts is larger than the sum of (motion while the vehicle is at a stop) and (measurement error), these three types of (wheel speed pulse count whose application has been put on hold) can be identified by using two thresholds. This makes it possible to estimate the rotation directions of the left and right wheels when the left and right wheels rotate in mutually opposite directions. On the other hand, when the left and right wheels rotate in the same direction, whether the left and right wheels rotate forward or backward cannot be determined by this method. In such a case, for example, whether the left and right wheels rotate forward or backward can be determined on the basis of other information such as acceleration fluctuation information obtained by the acceleration sensor, gradient information, and information on a change in driving force direction. When there is no other information for the determination, the wheel speed pulse counts whose application has been put on hold are discarded without being applied. When discarded, an error in yaw angle does not occur, but an error in information on a location change in the forward and backward direction occurs.

As described above, even when a wheel speed pulse count whose travel direction is unknown occurs while the vehicle is at a temporarily stop, it is possible to accurately estimate the self-vehicle location by estimating the travel direction.

A description will be given below of a specific example of the present embodiment with reference to the drawings. Note that, in the drawings, components or elements having the same action or function are denoted by the same reference numerals, and redundant description will be omitted as appropriate.

The present embodiment described below is an example where a self-vehicle location estimation system including the vehicle control device according to the present invention is applied to an automatic parking system. Since the automatic parking system controls the vehicle at a relatively low speed, almost no wheel slippage that causes an error in vehicle location estimation using the wheel speed sensor appear. Therefore, it is preferable that the self-vehicle location estimation system including the vehicle control device according to the present invention be applied to the automatic parking system. The automatic parking system according to the present embodiment detects a relative location relationship between the vehicle and various objects in the outside world by an external environment recognition means such as a camera and a radar to determine an automatic parking start point, an automatic parking destination point, an automatic parking route, and the like.

Figure 10:
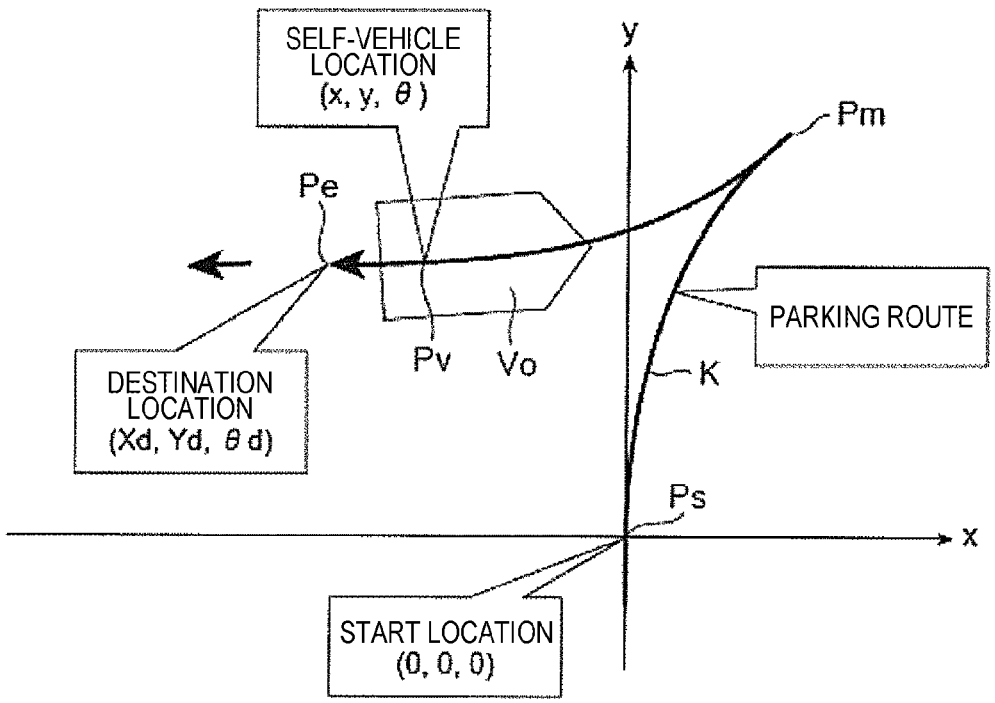
FIG. 10 is a diagram showing coordinates of a parking route for automatic parking by an automatic parking system.

As shown in FIG. 10, the automatic parking system performs feedback control through comparison between a self-vehicle location Pv and an automatic parking route K on the basis of the self-vehicle location estimation by the self-vehicle location estimation system including the vehicle control device according to the present invention so as to allow a self-vehicle Vo to reach an automatic parking destination point (destination location) Pe from an automatic parking start point Ps (start location) via a turning point Pm. However, in the following description of the present embodiment, for the sake of simplification, the description will only focus on the self-vehicle location estimation system in the automatic parking system.

Figure 11:
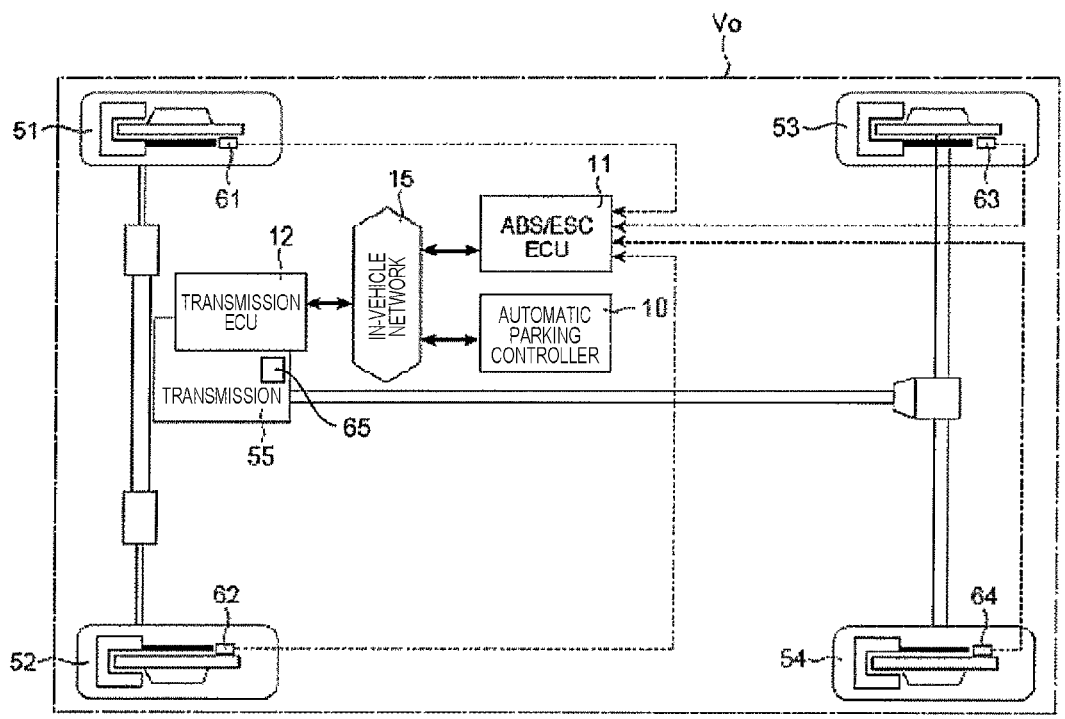
FIG. 11 is an overall structure diagram showing an example of a self-vehicle location estimation system including an embodiment of a vehicle control device according to the present invention.

FIG. 11 is an overall structure diagram showing an example of the self-vehicle location estimation system including an embodiment of the vehicle control device according to the present invention. As shown in FIG. 11, a self-vehicle location estimation system 1 primarily includes wheel speed sensors 61 to 64 installed on left and right steered wheels 51, 52 including left and right front wheels and left and right non-steered wheels 53, 54 including left and right rear wheels, an ABS/ESC electronic control unit (ECU) 11 acting as a braking force control device connected to the wheel speed sensors 61 to 64, a gear position detection sensor 65 (see FIG. 12) installed on a transmission 55, a transmission ECU 12 connected to the gear position detection sensor 65, and an automatic parking controller 10 acting as the vehicle control device, and the ABS/ESC_ECU 11, the transmission ECU 12, and the automatic parking controller 10 are communicatively interconnected over an in-vehicle network (CAN) 15.

The wheel speed sensors 61 to 64 each generate a pulsed waveform in response to rotation of a corresponding wheel, the ABS/ESC_ECU 11 detects leading and trailing edges of the pulsed waveform to count the leading and trailing edges (pulse count), and constantly notifies the automatic parking controller 10 of the pulse count. The gear position detection sensor 65 is a sensor that discriminates between the forward gear and reverse gear of the transmission 55, and the transmission ECU 12 detects the current gear position and constantly notifies the automatic parking controller 10 of the current gear position.

Figure 12:
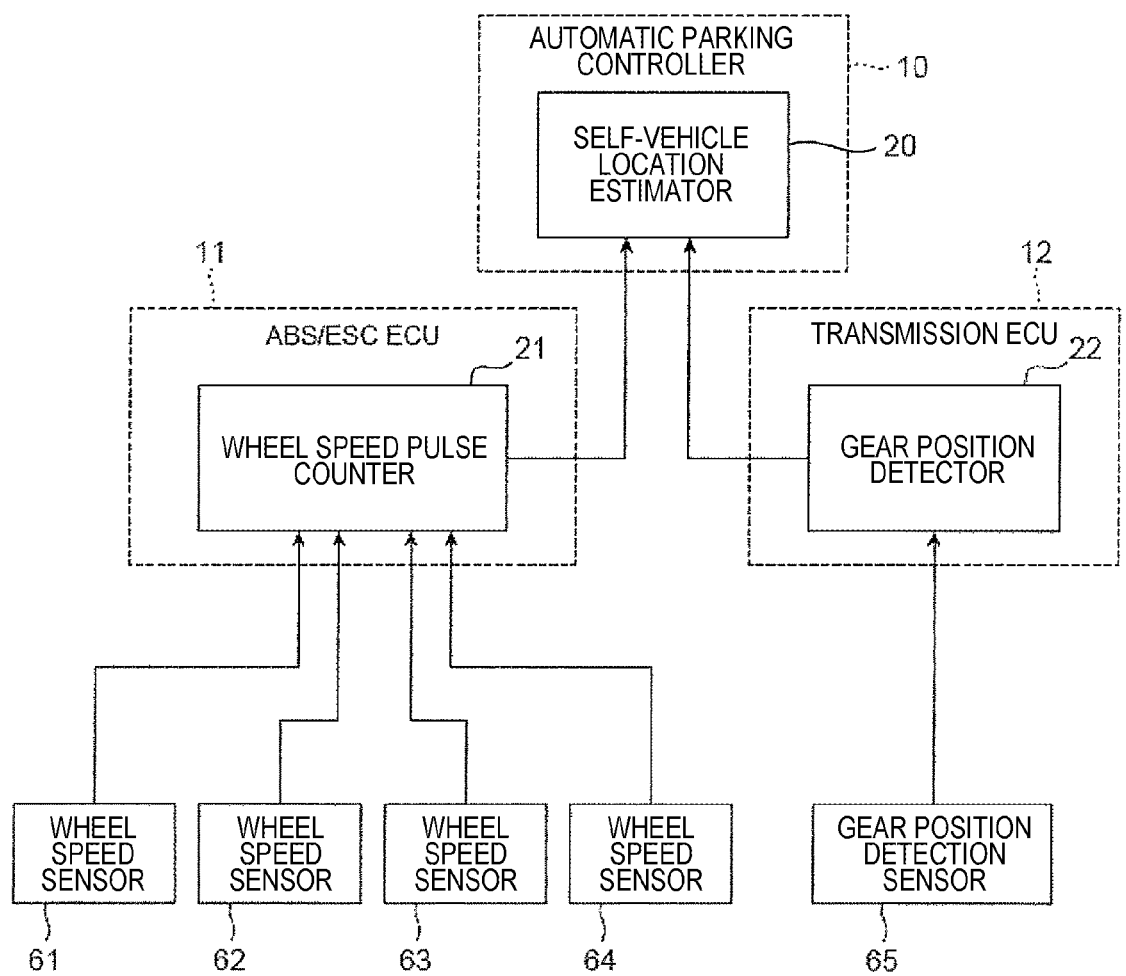
FIG. 12 is a control block diagram showing a control configuration of the automatic parking system shown in FIG. 11.

FIG. 12 is a control block diagram showing a control configuration of the automatic parking system shown in FIG. 11. As shown in FIG. 3, the ABS/ESC_ECU 11 includes a wheel speed pulse counter 21, the transmission ECU 12 includes a gear position detector 22, and the automatic parking controller 10 includes a self-vehicle location estimator 20.

The wheel speed pulse counter 21 is a control block implemented in the ABS/ESC_ECU 11, and shapes waveforms generated from the wheel speed sensors 61 to 64 into pulsed waveforms to count both the leading edges and trailing edges of the pulsed waveforms. The count value (wheel speed pulse count) is represented by, for example, an integer between 0 and 255 and is a circular value that returns to 0 when exceeding 255. The wheel speed pulse counter 21 sends information containing the count value to the in-vehicle network (CAN) 15, thereby allowing the other controllers including the automatic parking controller 10 to receive this information over the in-vehicle network (CAN) 15 to acquire the counter value of each of the wheel speed sensors 61 to 64.

The gear position detector 22 is a control block implemented in the transmission ECU 12, and sends information containing information on the gear position detected by the gear position detection sensor 65 to the in-vehicle network (CAN) 15, thereby allowing the other controllers including the automatic parking controller 10 to receive this information over the in-vehicle network (CAN) 15 to acquire the gear position information.

The self-vehicle location estimator 20 is a control block implemented in the automatic parking controller 10, and outputs the relative location and relative direction of the vehicle from the estimated start state on the basis of the counter values of the wheel speed sensors 61 to 64 of the wheels generated by the wheel speed pulse counter 21 and the gear position information generated by the gear position detector 22 to estimate the self-vehicle location of the vehicle, and provides information on the self-vehicle location thus estimated to the other functions in the automatic parking controller 10.

Figure 13:
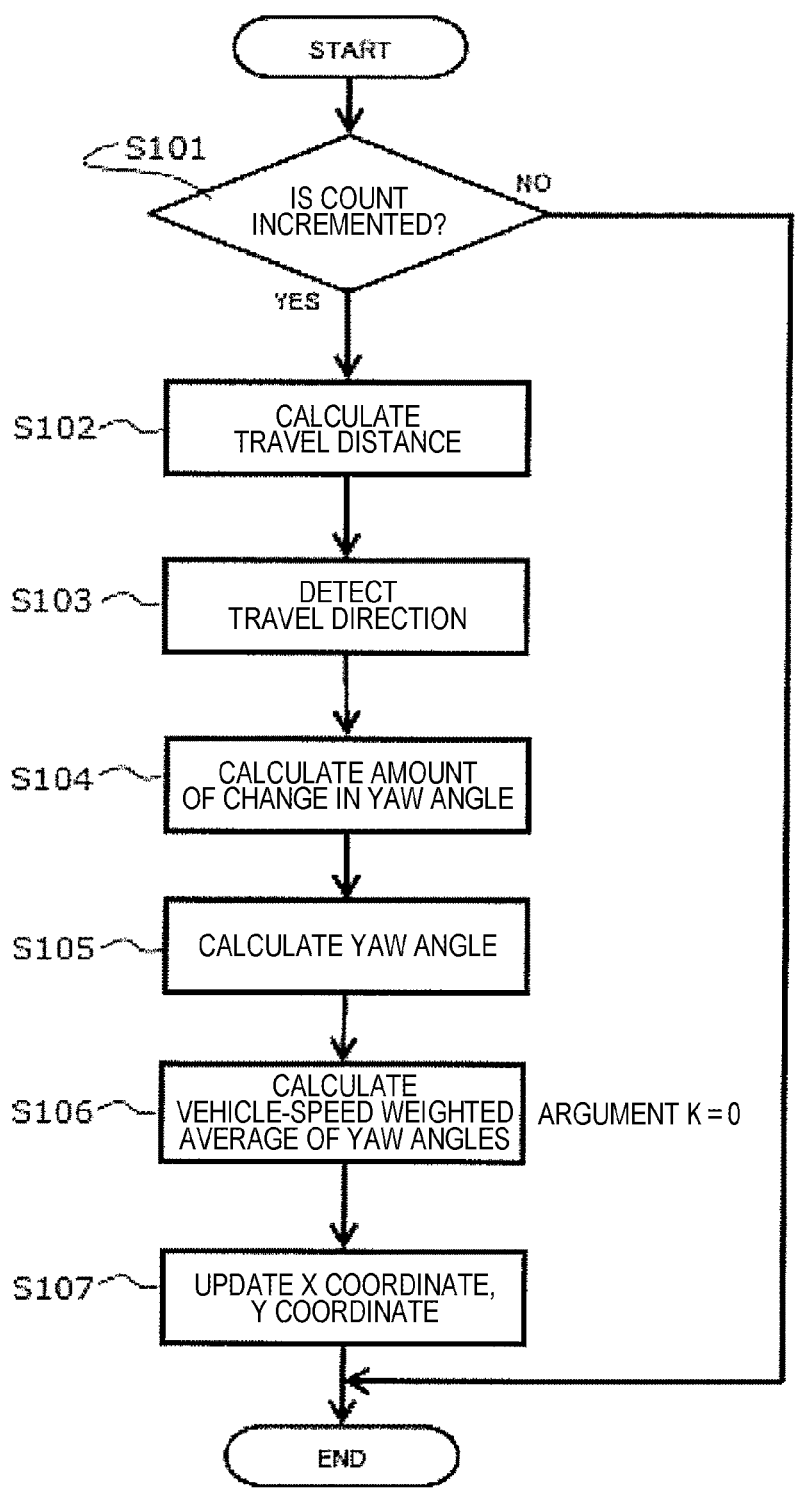
FIG. 13 is a flowchart schematically showing a self-vehicle location estimation method based on dead reckoning by a self-vehicle location estimator shown in FIG. 12.

FIG. 13 is a flowchart schematically showing a self-vehicle location estimation method based on dead reckoning by the self-vehicle location estimator shown in FIG. 12. A sequence shown in this flowchart is executed in each control period after the start of the self-vehicle location estimation.

First, upon initiation of processing in the self-vehicle location estimator 20, a determination is made as to whether an increment in count occurs in the left and right rear wheels (non-steered wheels) (step S101). When no increment in count occurs, the processing in this control period is terminated. On the other hand, when an increment in count occurs, the travel distance U is calculated from the equation (2) (step S102). Next, the travel direction is detected from the gear position information generated by the gear position detector 22 (step S103). When the gear position is a forward gear, the travel direction is detected as +1, and when the gear position is a reverse gear, the travel direction is detected as −1. Next, the amount of change in yaw angle θ is calculated from the equation (1) (step S104). Next, a yaw angle update is calculated from the equation (3) (step S105). Next, the vehicle-speed weighted average of yaw angles to be described later is calculated (step S106). Next, an X-coordinate update is calculated from the equation (4), and a Y-coordinate update is calculated from the equation (5) (step S107).

Note that, as described above, when the wheel speed sensors each have a mechanism of detecting the rotation direction of a corresponding wheel, the forward and backward travel direction can be detected on the basis of the information obtained from wheel speed sensors rather than the gear position information.

Figure 15:
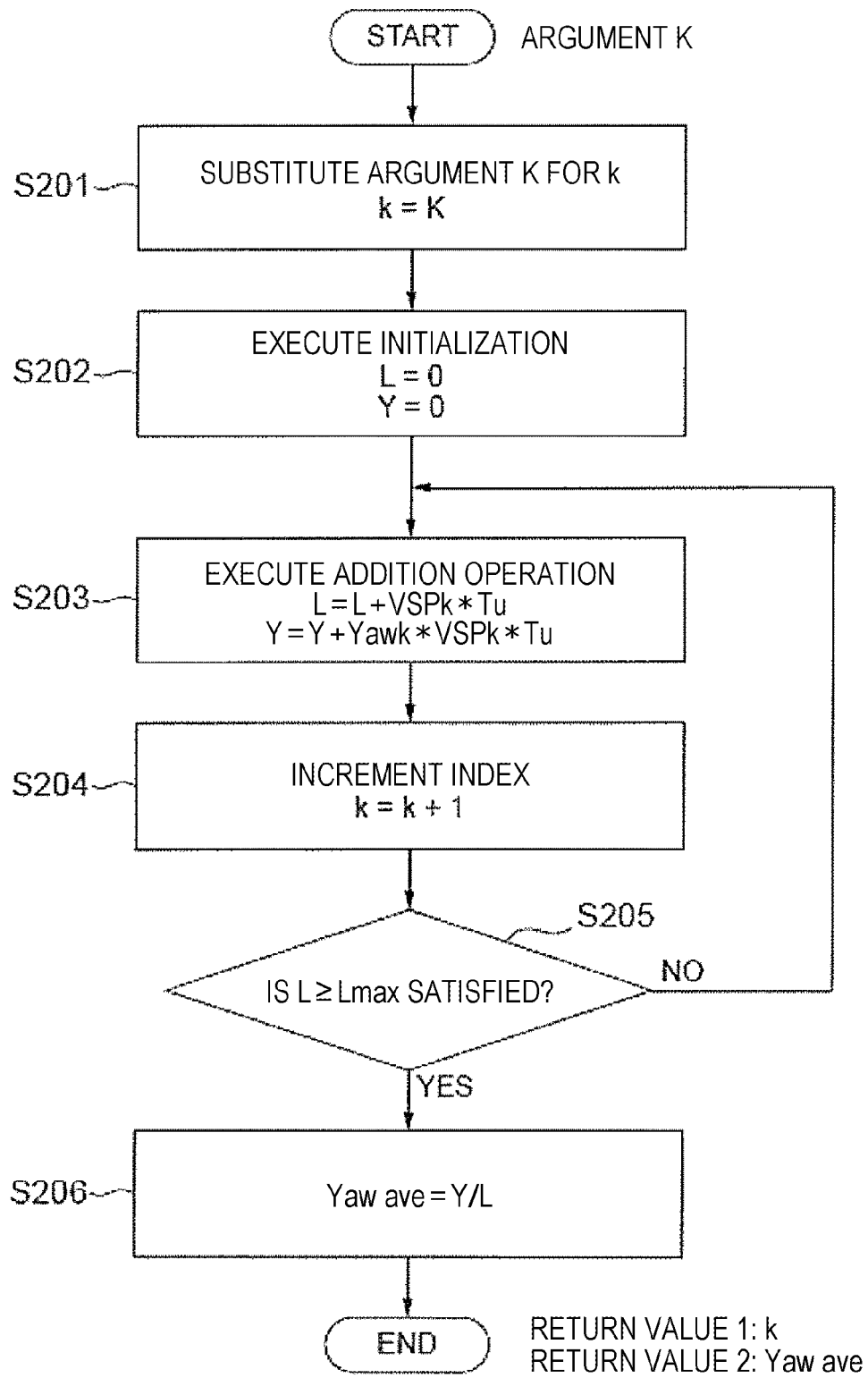
FIG. 15 is a flowchart showing a method for calculating the vehicle-speed weighted average of yaw angles.

A description will be given of the method for calculating the vehicle-speed weighted average of yaw angles shown in FIG. 13 with reference to FIGS. 14 and 15. FIG. 14 shows a temporary storage memory used in the calculation of the vehicle-speed weighted average of yaw angles shown in FIG. 15, showing a table used for calculating the vehicle-speed weighted average of yaw angles. FIG. 15 is a flowchart showing the method for calculating the vehicle-speed weighted average of yaw angles.

The self-vehicle location estimator 20 shifts stored content downward by one step in the temporary storage memory shown in FIG. 14 and stores the latest vehicle speed and yaw angle as the uppermost record in the temporary storage memory in each control period. Herein, in order to reduce the memory usage, a method for storing the vehicle speed and yaw angle only when the vehicle speed or yaw angle changes is applicable. Specifically, a method by which a duration during which the vehicle speed and yaw angle are kept unchanged is stored together with the vehicle speed and yaw angle, the latest vehicle speed and yaw angle are stored only when the vehicle speed or yaw angle changes, and, when no change occurs, the duration is incremented by each period is applicable.

In FIG. 15, the processing of calculating the vehicle-speed weighted average of yaw angles requires an argument K.

The argument K indicates a calculation start index of the temporary storage memory, and information accumulated before a designated index serving as a base point is used for calculation. In order to use information up to the latest information in the temporary storage memory, the argument K is set to 0.

In the calculation processing, first, the argument K is substituted for k (step S201). Next, for initialization, a variable L representing a distance is set to L=0 and a variable Y representing to a yaw angle is set to Y=0 (step S202). Next, the vehicle speed yaw angle table is searched, and L=L+VSPk*Tu and Y=Y+Yawk*VSPk*Tu are solved (step S203). Herein, Tu denotes a length of the control period. Next, k is incremented (step S204). Next, whether L is equal to or greater than a calculation section length Lmax is checked (step S205). When L is equal to or greater than Lmax, the control returns to step S203 to repeat the addition. When L is equal to or greater than Lmax, the control returns to step S203 to bring the addition to an end, and then the vehicle-speed weighted average of yaw angles is calculated from Yawave=Y/L (step S206). As the return value of the calculation, k (return value 1) used as the index and the vehicle-speed weighted average of yaw angles (Yawave: return value 2) are returned.

Figure 16:
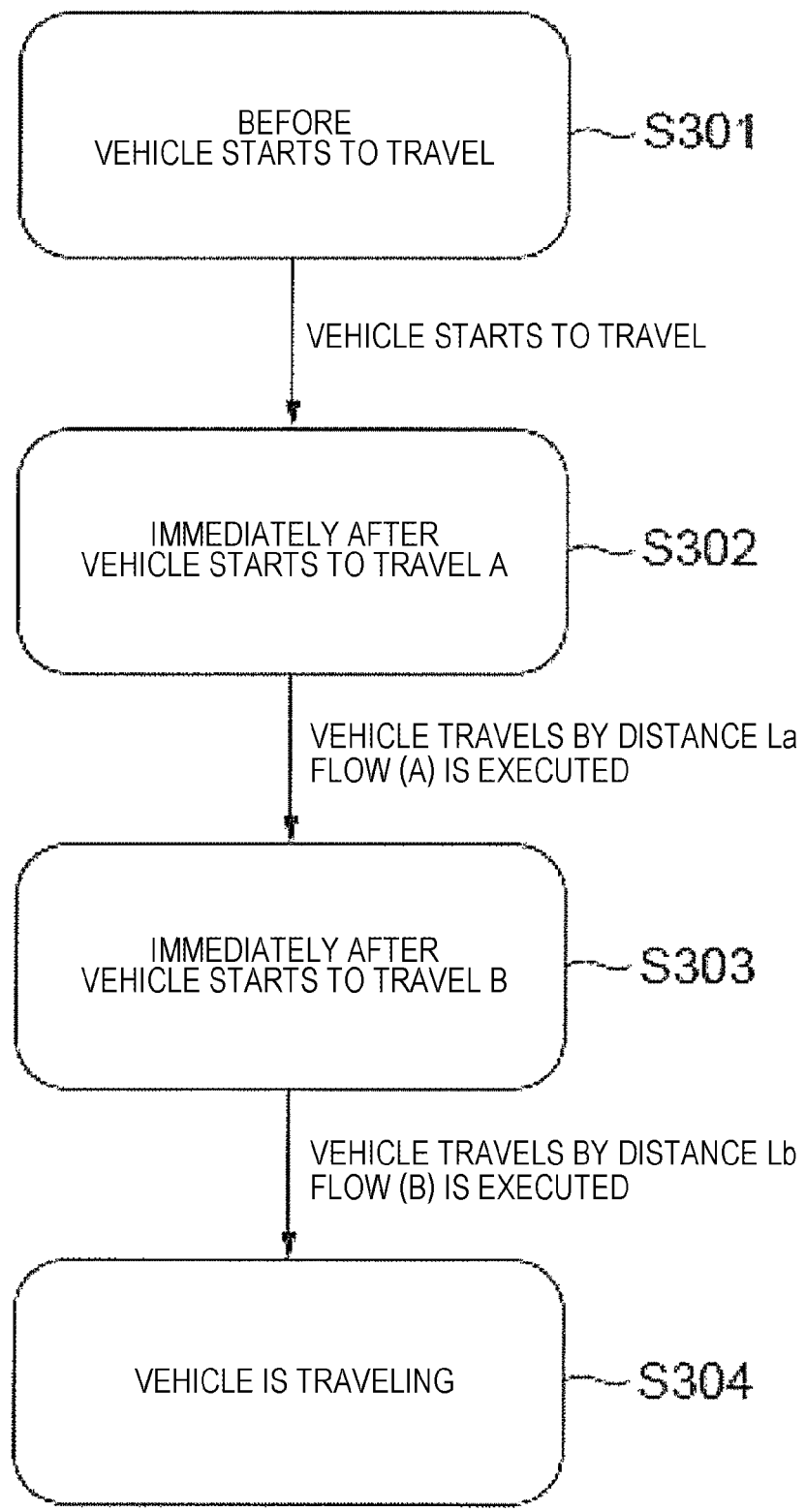
FIG. 16 is a state transition diagram showing an example of a method for correcting self-vehicle location estimation information.

FIG. 16 is a state transition diagram showing a method for correcting the self-vehicle location estimation information at necessary and sufficient timing immediately after the vehicle starts to travel with the self-vehicle location estimation information based on dead reckoning by the self-vehicle location estimator shown in FIG. 12 used as an estimated start point.

A state at the start of self-vehicle location estimation is "Before the vehicle starts to travel" (S301). When the travel start of the vehicle is detected in "Before the vehicle starts to travel" state, a transition is made to "Immediately after the vehicle starts to travel A" (S302). The detection of the travel start of the vehicle is made, for example, when an increment in the wheel speed pulse count is detected for all the wheels within a certain fixed time. When a cumulative travel distance exceeds La in "Immediately after the vehicle starts to travel A" state, a flow (A) is executed, and a transition is made to "Immediately after the vehicle starts to travel B" state (S303). When the cumulative travel distance exceeds Lb in "Immediately after the vehicle starts to travel B" state, a flow (B) is executed, and a transition is made to "The vehicle is traveling" state (S304). "The vehicle is traveling" state continues until the end of the self-vehicle location estimation.

Figure 17:
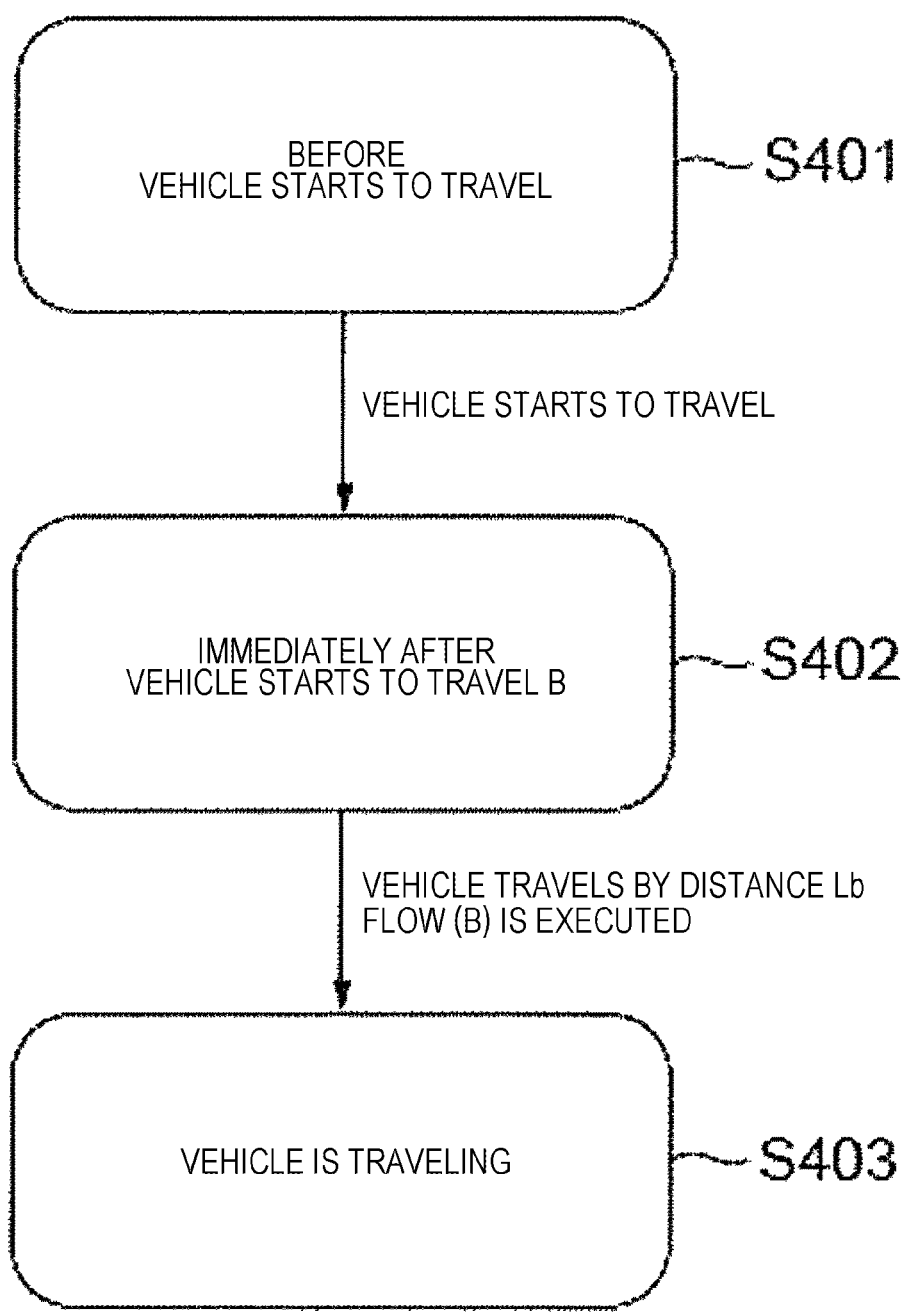
FIG. 17 is a state transition diagram showing another example of the method for correcting the self-vehicle location estimation information.

FIG. 17 is a state transition diagram showing simplified processing based on the state transition diagram shown in FIG. 16.

The state at the start of self-vehicle location estimation is "Before the vehicle starts to travel" (S401). When the travel start of the vehicle is detected in "Before the vehicle starts to travel" state, a transition is made to "Immediately after the vehicle starts to travel B" (S402). The detection of the travel start of the vehicle is made, for example, when an increment in the wheel speed pulse count is detected for all the wheels within a certain fixed time. When the cumulative travel distance exceeds Lb in "Immediately after the vehicle starts to travel B" state, the flow (B) is executed, and a transition is made to "The vehicle is traveling" state (S403). "The vehicle is traveling" state continues until the end of the self-vehicle location estimation.

Figure 18:
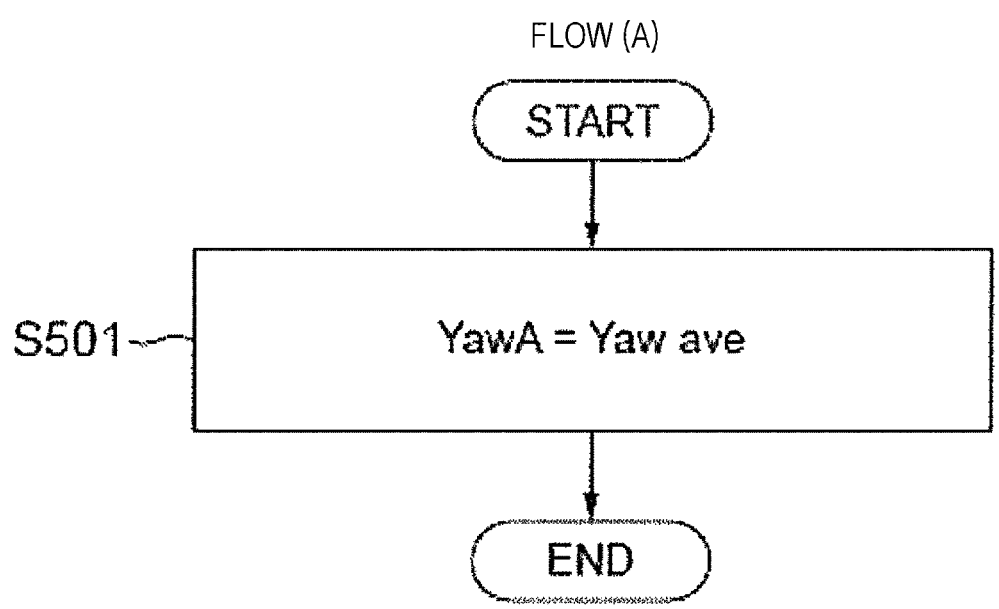
FIG. 18 is a flowchart of processing to be executed when a transition from S302 to S303 shown in FIG. 16 is made.

FIG. 18 is a flowchart of processing to be executed when a transition is made from "Immediately after the vehicle starts to travel A" to "Immediately after the vehicle starts to travel B" shown in FIG. 16. Upon initiation of the processing, the vehicle-speed weighted average of yaw angles Yawave at this time is acquired as YawA (step S501).

Figure 19:
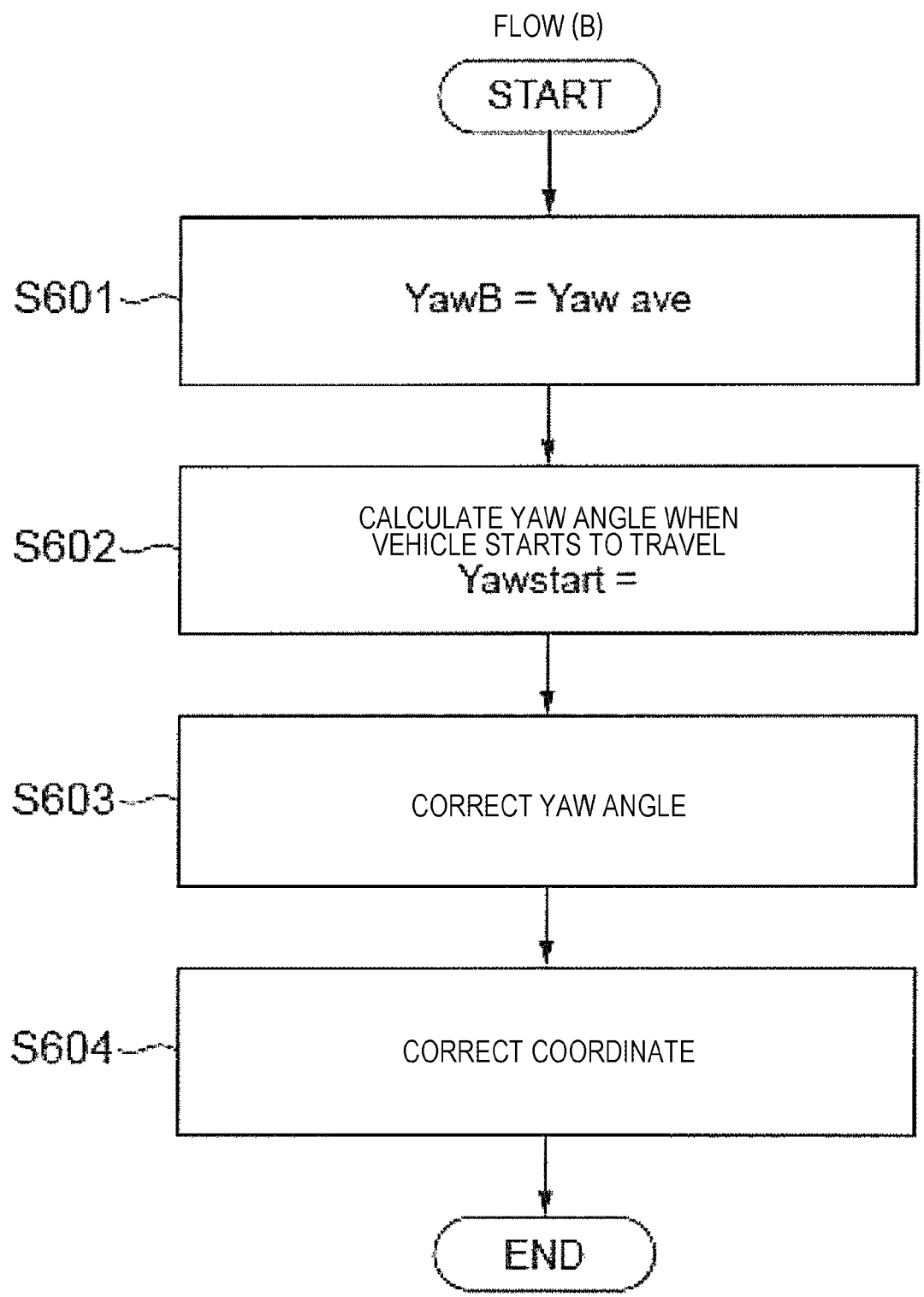
FIG. 19 is a flowchart of processing to be executed when a transition from S303 to S304 shown in FIG. 16 or from S402 to S403 shown in FIG. 17 is made.

FIG. 19 is a flowchart of processing to be executed when a transition is made from "Immediately after the vehicle starts to travel B" to "The vehicle is traveling" shown in FIGS. 16 and 17. Upon initiation of the processing, the vehicle-speed weighted average of yaw angles Yawave at this time is acquired as YawB (step S601).

Next, the yaw angle when the vehicle starts to travel is calculated from the equation (9) (step S602). In the simplified processing, the yaw angle is calculated from the equation (9)'.

Yaw angle when the vehicle starts to travel Yawstart=$(Lb-Lmax/2)/(Lb-La)*YawA-(La-Lmax/2)/(Lb-La)*YawB$ (9)

Yaw angle when the vehicle starts to travel Yawstart=YawB (9)'

Next, yaw angle correction is executed by using the equations (10) and (11).

Yaw angle error at the start of estimation Yawerror=(Yawstart)−(reference yaw angle at the start of estimation) (10)

Estimated yaw angle after correction=(estimated yaw angle before correction)−(Yawerror) (11)

Next, coordinate correction is executed. A description will be given below of a method for correcting coordinates with reference to FIG. 20. After the coordinate correction, this flow is brought to an end.

Figure 20:
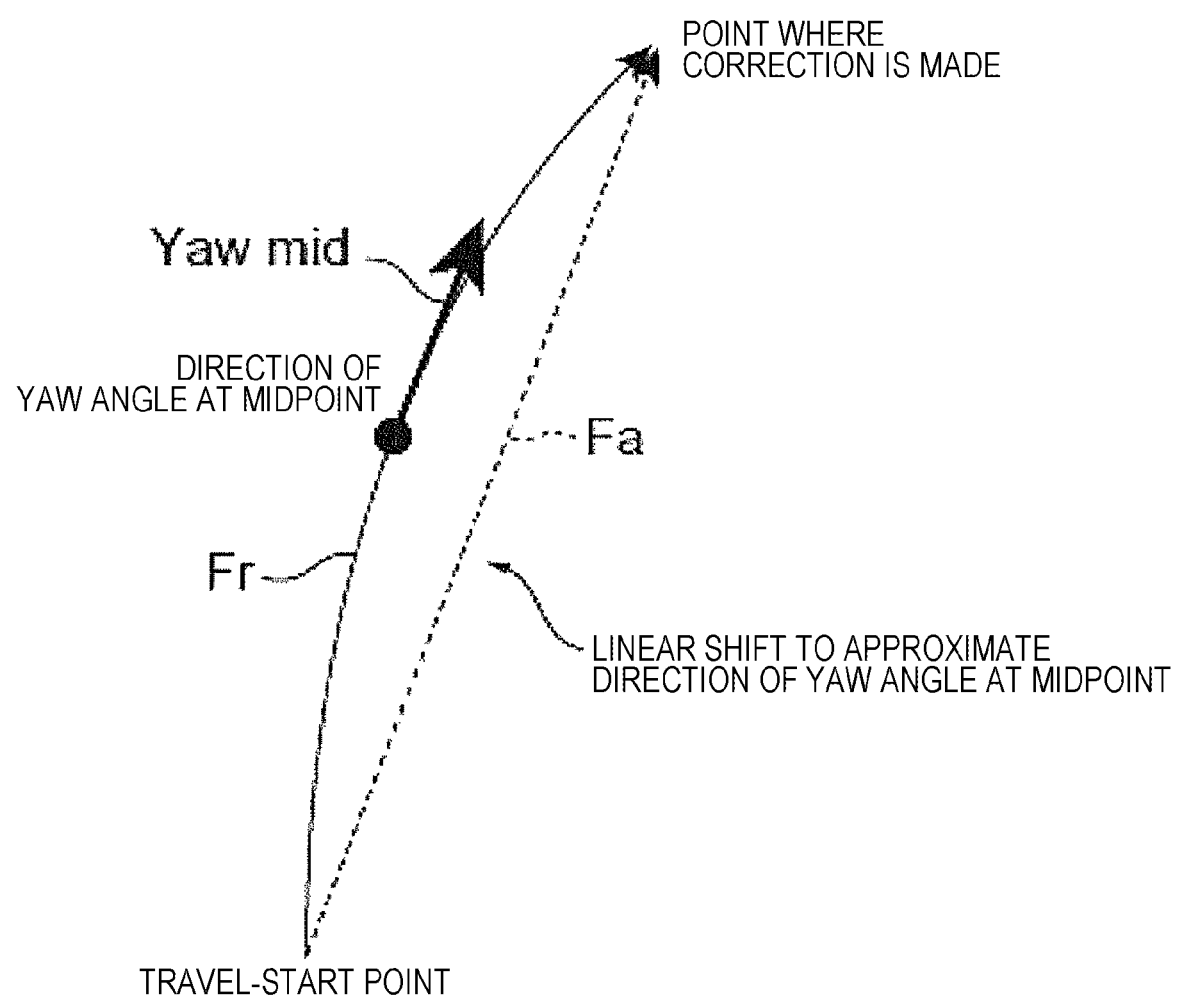
FIG. 20 is a diagram for describing coordinate correction when the vehicle starts to travel.

FIG. 20 is a diagram for describing the coordinate correction when the vehicle starts to travel. In the coordinate correction, a location after travel by a distance Lb from the travel-start point is approximated to a point shifted by the distance Lb in the yaw angle direction from a point after travel by a distance Lb/2.

In the coordinate correction, first, a yaw angle (referred to as a yaw angle at a midpoint or an intermediate yaw angle Yawmid) at a point after travel by the distance Lb/2 from the travel-start point is obtained from the equation (12).

Intermediate yaw angle Yawmid=$(Lb-Lmax)/(Lb-La)*YawA/2+(Lb-2La+Lmax)/(Lb-La)*YawB/2-Yawerror$ (12)

Next, a change in coordinate shifted by the distance Lb/2 from the travel-start point in the intermediate yaw angle direction serve as a coordinate correction amount in the equations (13) and (14).

Coordinate correction amount X=$Lb/2*\sin(Yawmid)$ (13)

Coordinate correction amount Y=$Lb/2*\cos(Yawmid)$ (14)

The coordinate correction amount is added to the coordinates at the travel-start point using the equations (15) and (16) to obtain corrected coordinates.

Corrected coordinate X=travel-start point coordinate X+coordinate correction amount X (15)

Corrected coordinate Y=travel-start point coordinate Y+coordinate correction amount Y (16)

The travel-start point coordinates are (0, 0) when the estimated travel-start point serves as the travel-start point coordinates and serves as the coordinate origin, for example.

Figure 21:
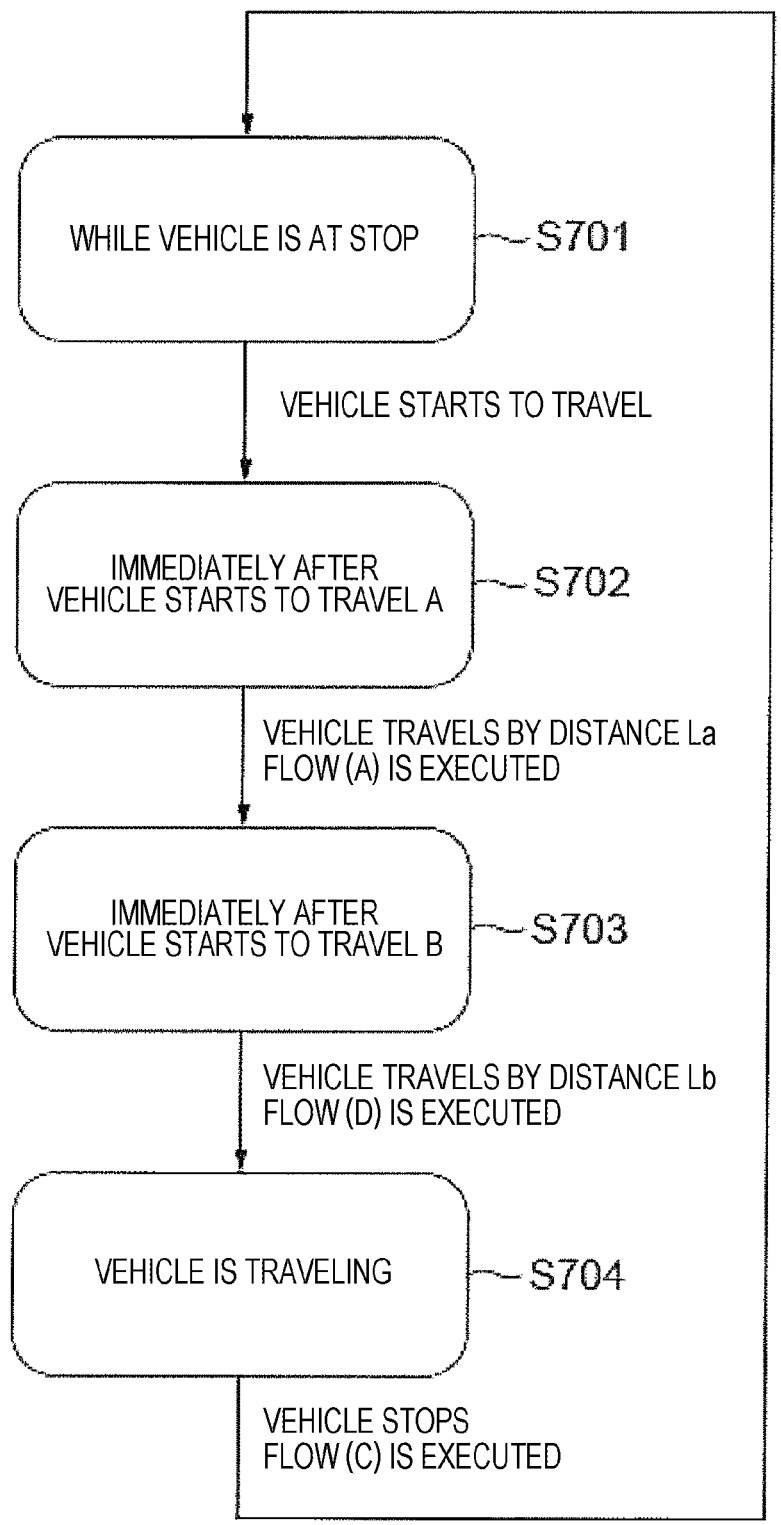
FIG. 21 is a state transition diagram showing an example of the method for correcting the self-vehicle location estimation information.

FIG. 21 is a state transition diagram showing a method for correcting the self-vehicle location estimation information at necessary and sufficient timing immediately after the vehicle starts to travel after being at a temporary stop, the self-vehicle location estimation information being based on dead reckoning by the self-vehicle location estimator shown in FIG. 12.

Although the state transition is cyclical, the description will be given in the order from "The vehicle is traveling" state (S704). When the stop of the vehicle is detected in "The vehicle is traveling" state (S704), a flow (C) is executed, and a transition is made to "While the vehicle is at a stop" (S701). The detection of the stop of the vehicle is made, for example, when no increment in the wheel speed pulse count is detected for all the wheels within a certain fixed time. In "While the vehicle is at a stop" state (S701), an increment in the wheel speed pulse count while the left and right non-steered wheels are at a stop is counted as a count while the vehicle is a stop. When the travel start of the vehicle is detected in "While the vehicle is at a stop" state, a transition is made to "Immediately after the vehicle starts to travel A" (S702). The detection of the travel start of the vehicle is made, for example, when an increment in the wheel speed pulse count is detected for all the wheels within a certain fixed time. Herein, when the travel direction is known, the increment in the wheel speed pulse count used for the detection of the travel start of the vehicle is applied to the estimated yaw angle and estimated location in accordance with the travel direction and then removed from the count while the vehicle is a stop. When the cumulative travel distance exceeds La in "Immediately after the vehicle starts to travel A" state (S702), the flow (A) is executed, and a transition is made to "Immediately after the vehicle starts to travel B" state (S703). When the cumulative travel distance exceeds Lb in "Immediately after the vehicle starts to travel B" state (S703), a flow (D) is executed, and a transition is made to "The vehicle is traveling" state (S704).

Figure 22:
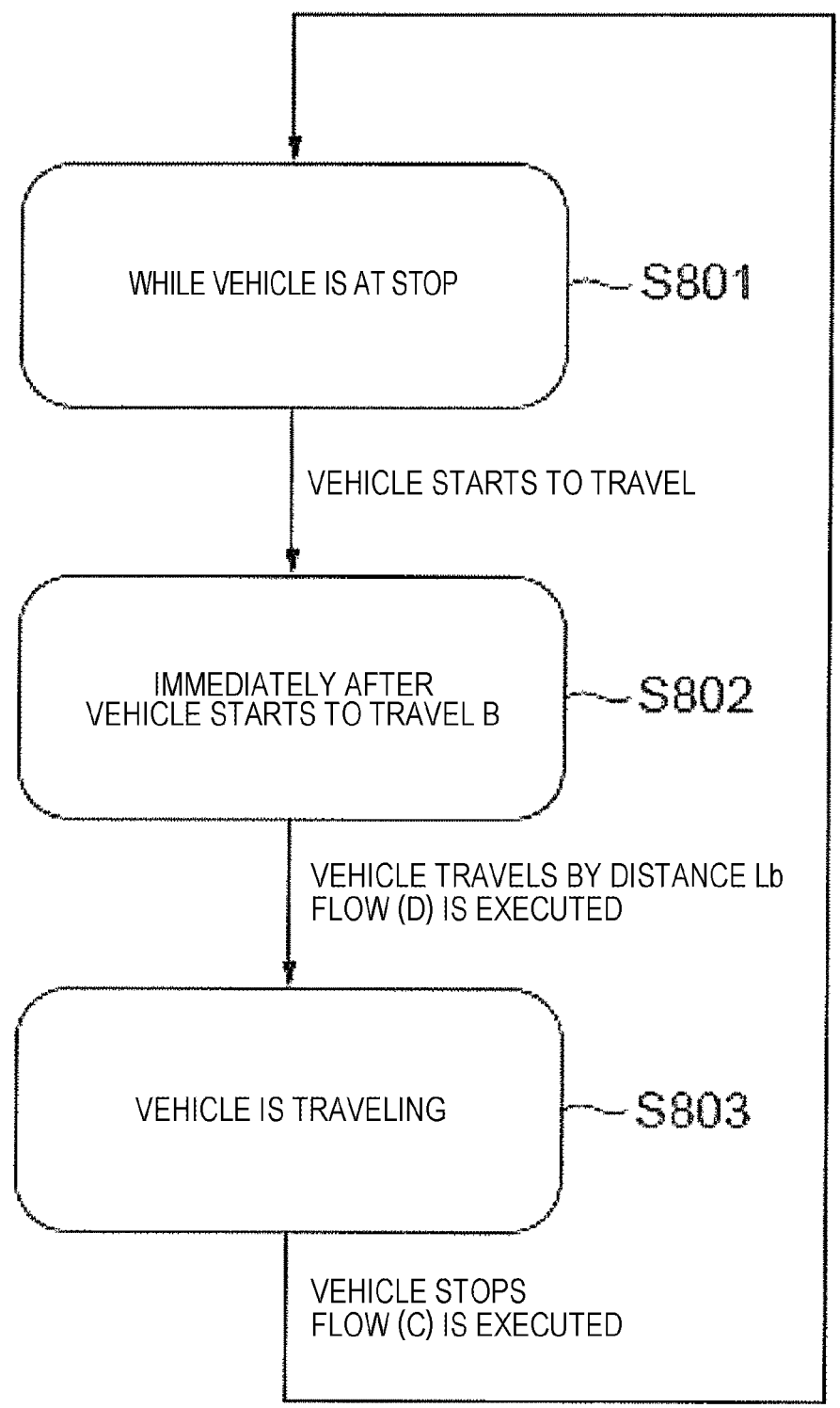
FIG. 22 is a state transition diagram showing another example of the method for correcting the self-vehicle location estimation information.

FIG. 22 is a state transition diagram showing simplified processing based on the state transition diagram shown in FIG. 21.

Although the state transition is cyclical, the description will be given in the order from "The vehicle is traveling" state (S803). When the stop of the vehicle is detected in "The vehicle is traveling" state (S803), the flow (C) is executed, and a transition is made to "While the vehicle is at a stop" (S801). The detection of the stop of the vehicle is made, for example, when no increment in the wheel speed pulse count is detected for all the wheels within a certain fixed time. In "While the vehicle is at a stop" state (S801), an increment in the wheel speed pulse count while the left and right non-steered wheels are at a stop is counted as the count while the vehicle is at a stop. When the travel start of the vehicle is detected in "Before the vehicle starts to travel" state, a transition is made to "Immediately after the vehicle starts to travel B" (S802). The detection of the travel start of the vehicle is made, for example, when an increment in the wheel speed pulse count is detected for all the wheels within a certain fixed time. Herein, when the travel direction is known, the increment in the wheel speed pulse count used for the detection of the travel start of the vehicle is applied to the estimated yaw angle and estimated location in accordance with the travel direction and then removed from the count while the vehicle is a stop. When the cumulative travel distance exceeds Lb in "Immediately after the vehicle starts to travel B" state (S802), the flow (D) is executed, and a transition is made to "The vehicle is traveling" state (S803).

Figure 23:
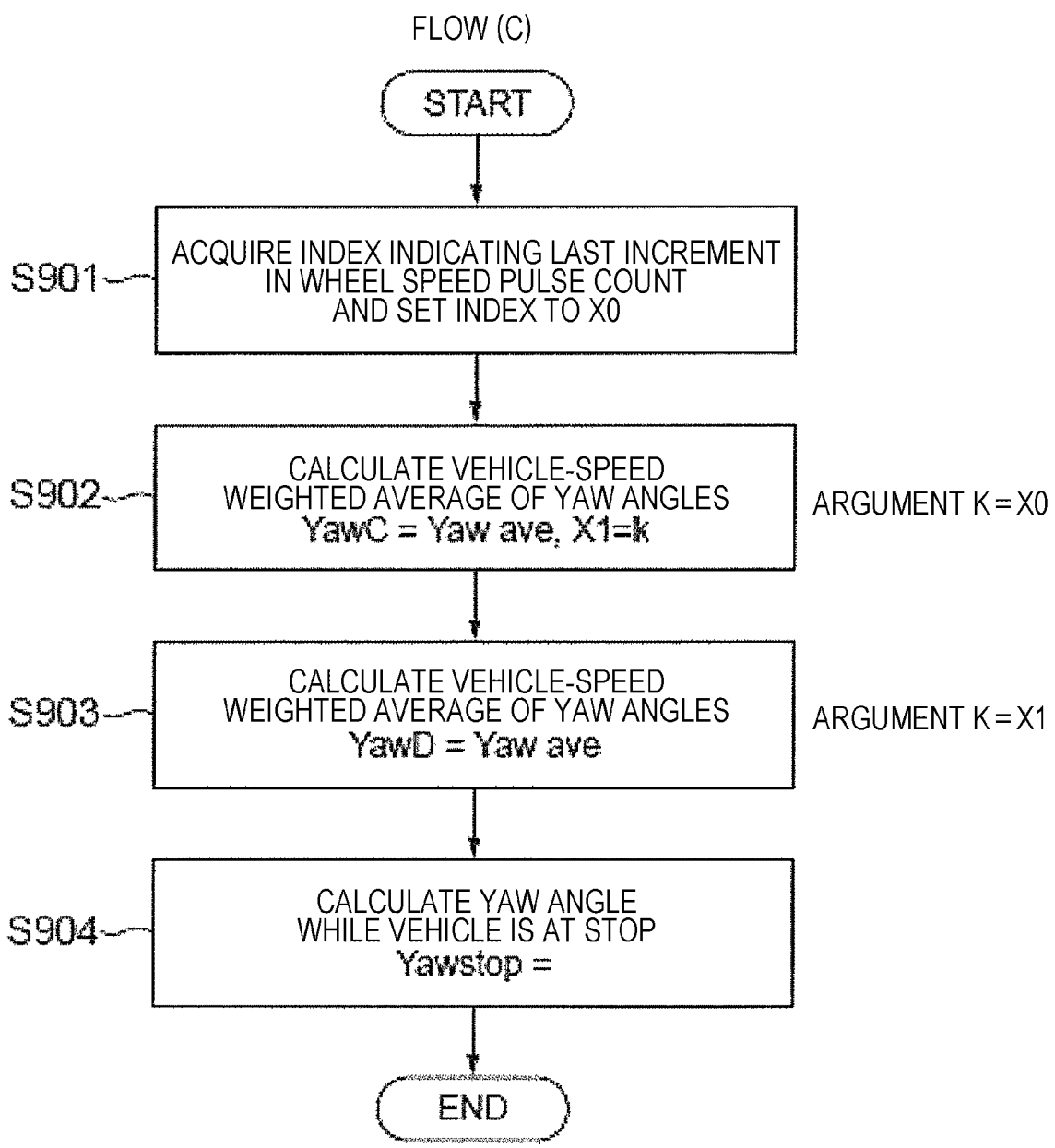
FIG. 23 is a flowchart of processing of estimating a yaw angle while the vehicle is at a stop, the processing being executed when a transition from S704 to S701 shown in FIG. 21 or from S803 to S801 shown in FIG. 22 is made.

FIG. 23 is a flowchart of processing to be executed when a transition is made from "The vehicle is traveling" to "While the vehicle is at a stop" shown in FIGS. 21 and 22.

Upon initiation of the processing, an index indicating the last increment in the wheel speed pulse count in the table used for calculating the vehicle-speed weighted average of yaw angles is acquired and set to X0 (step S901). Next, the vehicle-speed weighted average of yaw angles Yawave is calculated with the argument K set to X0 and obtained as YawC (step S902). The return value k at this time is set to X1.

Next, the vehicle-speed weighted average of yaw angles Yawave is calculated with the argument K set to X1 and obtained as YawD (step S903). Next, the yaw angle while the vehicle is at a stop Yawstop is calculated from the equation (17) (step S904).

$$\text{Yaw angle while the vehicle is at a stop Yawstop} = (3/2)^*\text{Yaw}C - (1/2)^*\text{Yaw}D \tag{17}$$

The flow (C) is as described above.

Figure 24:
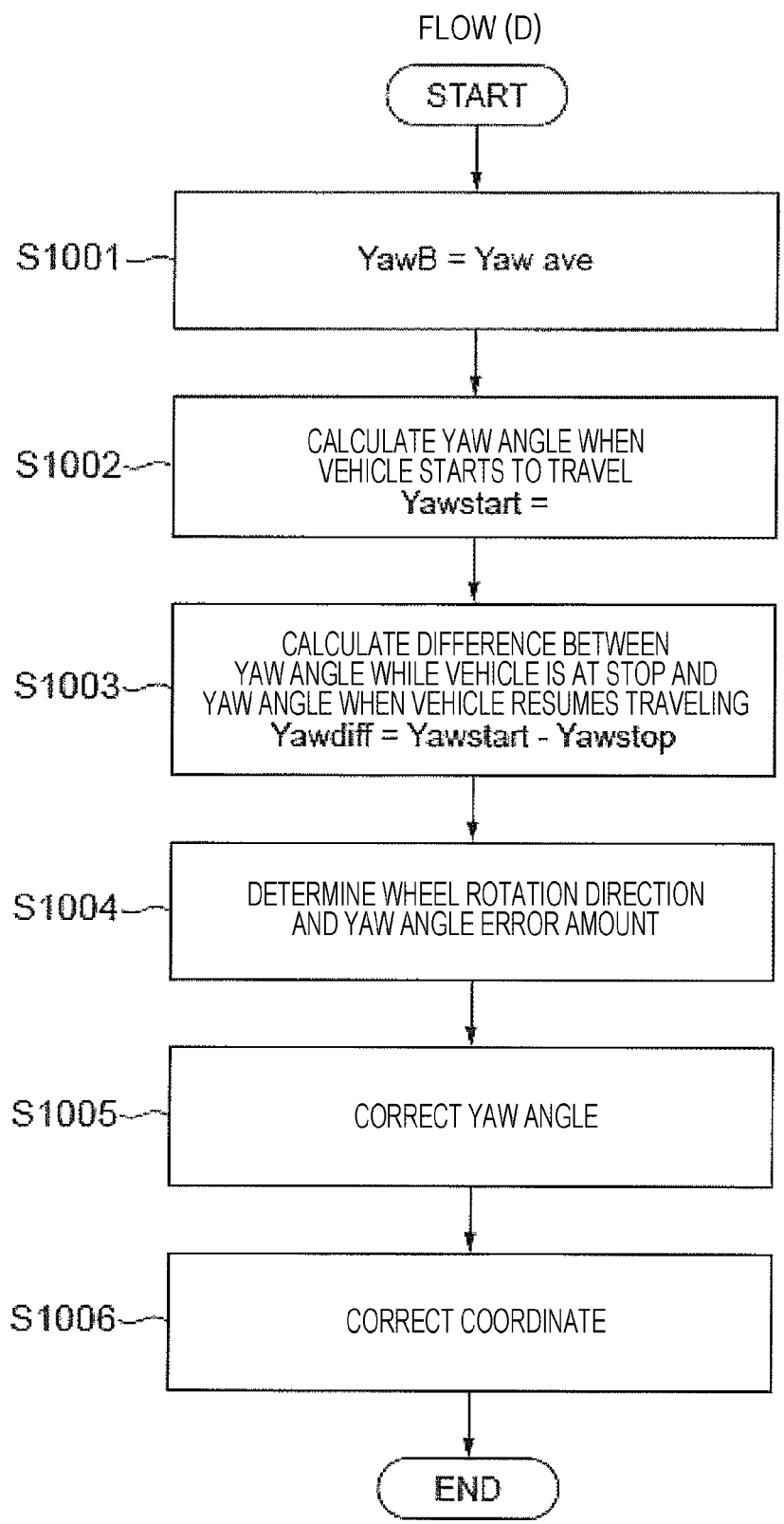
FIG. 24 is a flowchart of processing of estimating a yaw angle when the vehicle resumes traveling, the processing being executed when a transition from S703 to S704 shown in FIG. 21 or from S802 to S803 shown in FIG. 22 is made.

FIG. 24 shows the flow (D) of processing to be executed when a transition is made from "Immediately after the vehicle starts to travel B" to "The vehicle is traveling" shown in FIGS. 21 and 22. FIG. 25 is a determination table that is used in this processing. In the flow (D), upon initiation of the processing, the vehicle-speed weighted average of yaw angles Yawave at this time is acquired as YawB (step S1001).

Next, the yaw angle when the vehicle starts to travel Yawstart is calculated from the equation (8) (step S1002). In the simplified processing, the yaw angle when the vehicle starts to travel Yawstart is calculated from the above equation (8)'.

Next, on the basis of the yaw angle when the vehicle starts to travel Yawstart and the yaw angle while the vehicle is at a stop Yawstop, a difference between the yaw angle while the vehicle is at a stop and the yaw angle when the vehicle starts to travel Yawdiff is calculated from the equation (18) (step S1003).

$$\text{Difference between the yaw angle while the vehicle is at a stop and the yaw angle when the vehicle starts to travel Yawdiff} = \text{Yawstart} - \text{Yawstop} \tag{18}$$

Next, in accordance with the determination table shown in FIG. 25, a rotation direction of pulses of the left and right wheels while the vehicle is at a stop, a yaw angle error amount Yawerror, and a travel distance correction amount Lerror are calculated from the count while the vehicle is a stop and the difference between the yaw angle while the vehicle is at a stop and the yaw angle when the vehicle starts to travel Yawdiff (step S1004). When the count while the vehicle is a stop is odd for both the left and right wheels, and Yawdiff is close to zero, it is conceivable that the vehicle moves back and forth without changes in yaw angle. But, for example, if a driving force direction of the vehicle is changed while the vehicle is at a stop, there is a high possibility that the vehicle has moved in the direction thus changed, and therefore a method for determining the rotation direction of the left and right wheels on the basis of information on the change in driving force direction is conceived.

Next, the yaw angle correction is executed (step S1005). The yaw angle correction is executed using the equation (19).

$$\text{Estimated yaw angle after correction} = \text{estimated yaw angle before correction} - \text{Yawerror} \tag{19}$$

Next, the coordinate correction is executed (step S1006). The method of coordinate correction is the same as the method described with reference to FIG. 20. Note that the travel distance correction amount Z corresponding to the pulses generated while the vehicle is at a stop is applied to the distance. When the travel direction after the vehicle starts to travel is a forward direction, Lerror is added to Z, and when the travel direction is a backward direction, Lerror whose sign has been inverted is added to Z.

$$\text{Coordinate correction } X = (Lb/2+Z)^*\sin(\text{Yawmid}) \tag{20}$$

$$\text{Coordinate correction } Y = (Lb/2+Z)^*\cos(\text{Yawmid})) \tag{21}$$

Next, the coordinate correction amount is added to the coordinates of the point where the vehicle is at a stop.

$$\text{Corrected coordinate } X = \text{coordinate of the point where the vehicle is at a stop } X + \text{coordinate correction amount } X \tag{22}$$

$$\text{Corrected coordinate } Y = \text{coordinate of the point where the vehicle is at a stop } Y + \text{coordinate correction amount } Y \tag{23}$$

After the coordinate correction, this flow is brought to an end.

The embodiment of the present invention has been described in detail. However, the present invention is not limited to the above embodiment, and various design changes may be made without departing from the spirit of the present invention as defined in the appended claims. For example, the above description of the embodiment has been given in detail in order to facilitate the understanding of the present invention, and the present invention is not necessarily limited to an embodiment having all the components described above. Further, some of the components of one embodiment can be replaced with corresponding components of another embodiment, and a component of another embodiment can be added to the components of one embodiment. Further, it is possible to add different components to the components of each embodiment, delete some of the components of each embodiment, and replace some of the components of each embodiment with different components.

REFERENCE SIGNS LIST 1 self-vehicle location estimation system
10 automatic parking controller (vehicle control device)
11 ABS/ESC-ECU
12 transmission ECU
15 in-vehicle network (CAN)
20 self-vehicle location estimator
21 wheel speed pulse counter
22 gear position detector
51 right front wheel (right steered wheel)
52 left front wheel (left steered wheel)
53 right rear wheel (right non-steered wheel)
54 left rear wheel (left non-steered wheel)
55 transmission
61 to 64 wheel speed sensor
65 gear position detection sensor

The invention claimed is:

1. A vehicle control device, comprising:
at least one processor configured to:
   calculate an amount of change in yaw angle, a travel distance, and a forward and backward travel direction on a basis of information from a sensor installed on a vehicle,
   calculate, from the amount of change in yaw angle, the travel distance, and the forward and backward travel direction, a relative location and relative direction from an estimated start state of a travel direction of the vehicle to estimate a self-vehicle location,
   calculate the relative direction based on a vehicle-speed weighted average of yaw angle values for a fixed distance or a fixed time,
   calculate a yaw angle error at an estimated start point from the vehicle-speed weighted average of the yaw angle values obtained when the vehicle starts to travel from the estimated start point,
   correct the yaw angle error based on the vehicle-speed weighted average of yaw angle values, and
   control the vehicle to park at a parking destination based on the estimated self-vehicle location.

2. The vehicle control device according to claim 1, wherein
the at least one processor is configured to calculate the amount of change in yaw angle from a difference between travel distances of left and right non-steered wheels and left and right-side distances from a center between the left and right non-steered wheels to the left and right non-steered wheels.

3. The vehicle control device according to claim 2, wherein
the at least one processor is configured to calculate the travel distance from an average of the travel distances of the left and right non-steered wheels.

4. The vehicle control device according to claim 3, wherein
the at least one processor is configured to calculate the travel distances of the left and right non-steered wheels by wheel speed sensors configured to count pulses generated when the wheels rotate.

5. A vehicle control device, comprising:
at least one processor configured to:
   calculate an amount of change in yaw angle, a travel distance, and a forward and backward travel direction on a basis of information from a sensor installed on a vehicle,
   calculate, from the amount of change in yaw angle, the travel distance, and the forward and backward travel direction, a relative location and relative direction from an estimated start state of a travel direction of the vehicle to estimate a self-vehicle location,
   calculate the relative direction based on a vehicle-speed weighted average of yaw angle values for a fixed distance or a fixed time,
   calculate a yaw angle error at an estimated start point from the vehicle-speed weighted average of the yaw angle values obtained at a plurality of points when the vehicle starts to travel from the estimated start point,
   correct the yaw angle error based on the vehicle-speed weighted average of yaw angle values, and
   control the vehicle to park at a parking destination based on the estimated self-vehicle location.

6. The vehicle control device according to claim 5, wherein
the at least one processor is configured to correct the relative direction on a basis of the yaw angle error at the estimated start point.

7. The vehicle control device according to claim 5, wherein
the at least one processor is configured to correct the relative location through rotation of the relative location around the estimated start point on a basis of the yaw angle error at the estimated start point.

8. The vehicle control device according to claim 5, wherein
the at least one processor is configured to estimate a direction at a midpoint of a travel section extending to a correction point, and correct the relative location on a basis of the direction estimated at the midpoint.

9. The vehicle control device according to claim 5, wherein
the at least one processor is configured to extract an abnormal value from the vehicle-speed weighted average of the yaw angle values obtained at a plurality of time points after the vehicle starts to travel and correct or move the extracted abnormal value.

* * * * *